(12) United States Patent
Koller et al.

(10) Patent No.: US 11,484,147 B2
(45) Date of Patent: Nov. 1, 2022

(54) METHOD FOR FOAMING A BEVERAGE

(71) Applicant: Starbucks Corporation, Seattle, WA (US)

(72) Inventors: Izaak Koller, Seattle, WA (US); Joshua Kruger, Seattle, WA (US); Timothy Hurd, Sumner, WA (US)

(73) Assignee: Starbucks Corporation, Seattle, WA (US)

( * ) Notice: Subject to any disclaimer, the term of this patent is extended or adjusted under 35 U.S.C. 154(b) by 22 days.

(21) Appl. No.: 17/303,855

(22) Filed: Jun. 9, 2021

(65) Prior Publication Data

US 2021/0289983 A1 Sep. 23, 2021

Related U.S. Application Data

(62) Division of application No. 16/124,048, filed on Sep. 6, 2018, now Pat. No. 11,058,250.

(51) Int. Cl.
*A47J 31/44* (2006.01)
*A47J 31/52* (2006.01)

(52) U.S. Cl.
CPC ....... *A47J 31/4496* (2013.01); *A47J 31/4485* (2013.01); *A47J 31/4489* (2013.01); *A47J 31/5253* (2018.08); *A47J 31/5255* (2018.08)

(58) Field of Classification Search
CPC ............. A47J 31/4485; A47J 31/4489; A47J 31/4496; A47J 31/5253; A47J 31/5255
See application file for complete search history.

(56) References Cited

U.S. PATENT DOCUMENTS

| | | |
|---|---|---|
| 6,006,654 A | 12/1999 | Pugh |
| 6,158,328 A | 12/2000 | Cai |
| 6,840,163 B2 | 1/2005 | Oldani et al. |
| 6,901,848 B2 | 6/2005 | Beretta |
| 7,021,206 B2 | 4/2006 | Eckenhausen et al. |
| 7,487,711 B2 | 2/2009 | Carbonini |
| 7,600,467 B2 | 10/2009 | Coccia et al. |
| 8,003,148 B2 | 8/2011 | Schödler |
| 8,403,306 B2 | 3/2013 | Stahl et al. |

(Continued)

FOREIGN PATENT DOCUMENTS

| | | |
|---|---|---|
| EP | 2409611 A1 | 1/2012 |
| EP | 2446788 A1 | 5/2012 |

(Continued)

OTHER PUBLICATIONS

International Search Report and Written Opinion for International Application No. PCT/US2019/048525 dated Nov. 11, 2019, in 24 pages.

*Primary Examiner* — Anthony J Weier
(74) *Attorney, Agent, or Firm* — Knobbe, Martens, Olson & Bear, LLP

(57) ABSTRACT

Various automated and semi-automated beverage preparation systems and methods are shown. The beverage preparation system can include a container assembly configured to receive beverage, such as a milk. The container assembly can be configured to receive a flow of steam, air, or additional gasses and vapors to heat and/or aerate the beverage residing therein. The container assembly can include a temperature sensor configured to monitor the rate of heating, and automatically adjust the heating and aeration parameters accordingly.

15 Claims, 17 Drawing Sheets

(56) References Cited

U.S. PATENT DOCUMENTS

| | | |
|---|---|---|
| 8,515,574 B2 | 8/2013 | Studor et al. |
| 8,657,262 B2 | 2/2014 | Burri et al. |
| 8,661,968 B2 | 3/2014 | Turi et al. |
| 8,991,795 B2 | 3/2015 | Studor et al. |
| 9,474,408 B2 | 10/2016 | Dollner et al. |
| 10,271,679 B2 * | 4/2019 | Purton ................. A23C 9/1524 |
| 11,058,250 B2 | 7/2021 | Koller et al. |
| 11,272,806 B1 * | 3/2022 | Studor .................. A47J 31/525 |
| 2007/0089612 A1 | 4/2007 | Coccia et al. |
| 2009/0255415 A1 | 10/2009 | Cheng et al. |
| 2010/0107891 A1 | 5/2010 | Vanderstegen-Drake et al. |
| 2010/0323074 A1 | 12/2010 | Fliegauf et al. |
| 2012/0073449 A1 | 3/2012 | Volonté et al. |
| 2013/0040028 A1 | 2/2013 | Doppe et al. |
| 2013/0209639 A1 | 8/2013 | Larson et al. |
| 2015/0013552 A1 | 1/2015 | Tsang et al. |
| 2015/0104548 A1 | 4/2015 | Yip |
| 2016/0000259 A1 | 1/2016 | Studor et al. |
| 2016/0058238 A1 | 3/2016 | Purton |
| 2016/0235243 A1 | 8/2016 | Grassia et al. |
| 2016/0367071 A1 | 12/2016 | Dollner et al. |
| 2017/0359996 A1 | 12/2017 | Adriaens |
| 2017/0367525 A1 | 12/2017 | Buchholz et al. |
| 2018/0368610 A1 | 12/2018 | Cummer et al. |
| 2019/0059638 A1 | 2/2019 | Dees |
| 2019/0174950 A1 * | 6/2019 | Hendrickson ....... A47J 31/4489 |

FOREIGN PATENT DOCUMENTS

| | | |
|---|---|---|
| EP | 3051988 A1 | 8/2016 |
| WO | WO 01/97668 A1 | 12/2001 |
| WO | WO2010121299 A1 | 10/2010 |
| WO | WO2011048078 A2 | 4/2011 |
| WO | WO2016097923 A1 | 6/2016 |
| WO | WO2016150731 A1 | 9/2016 |
| WO | WO2016154662 A1 | 10/2016 |
| WO | WO2016207850 A1 | 12/2016 |
| WO | WO2017003288 A1 | 1/2017 |
| WO | WO2017155401 A1 | 9/2017 |

* cited by examiner

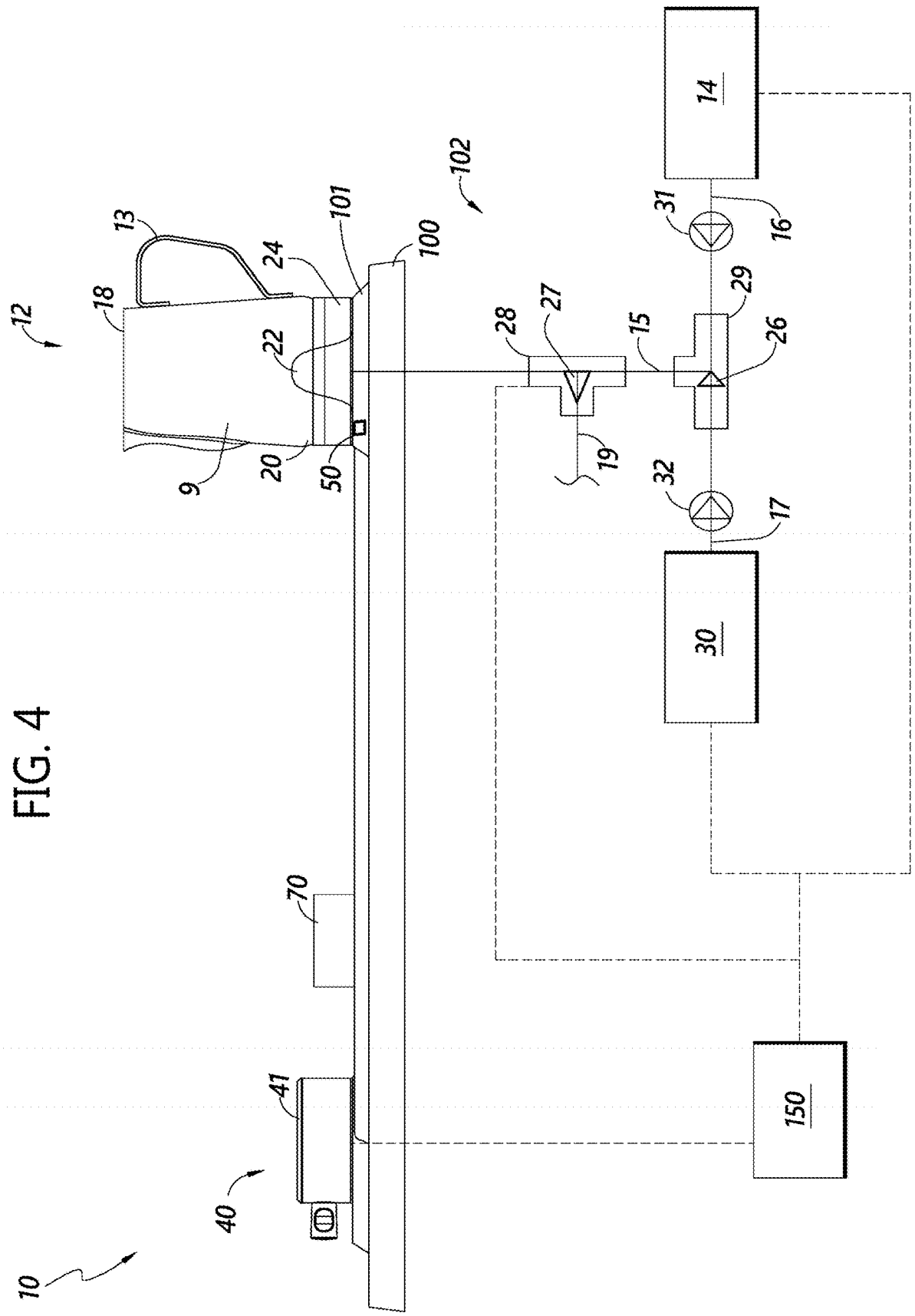

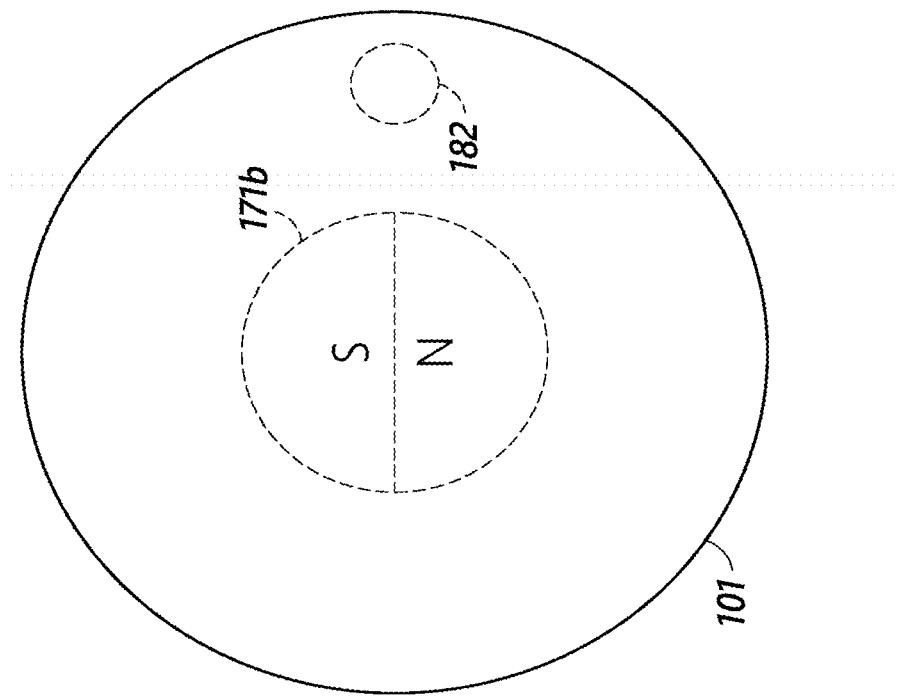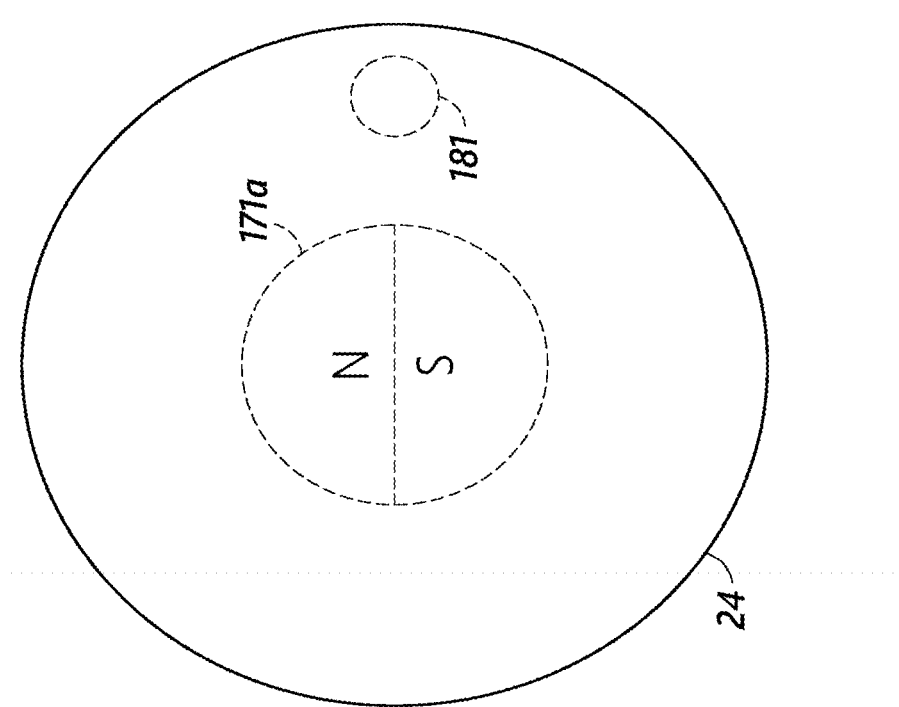
FIG. 10A

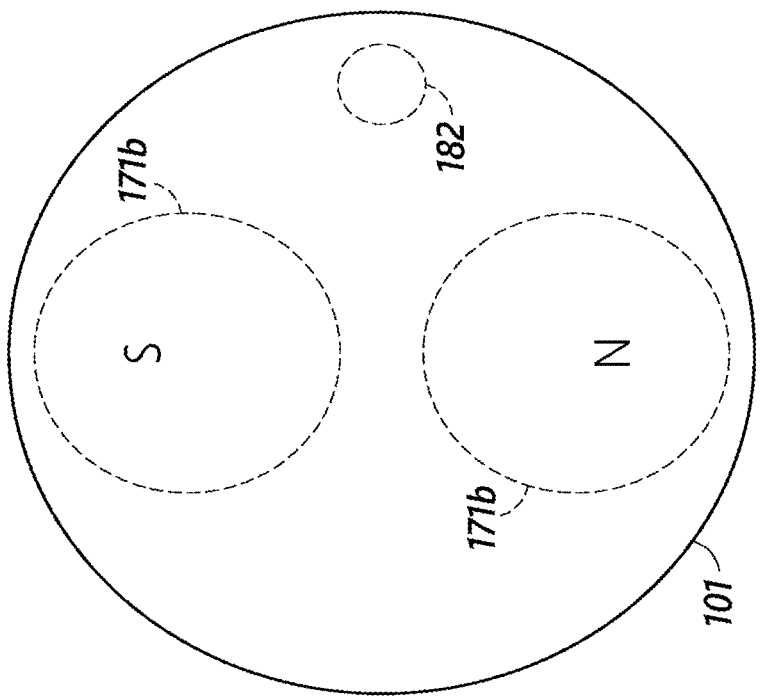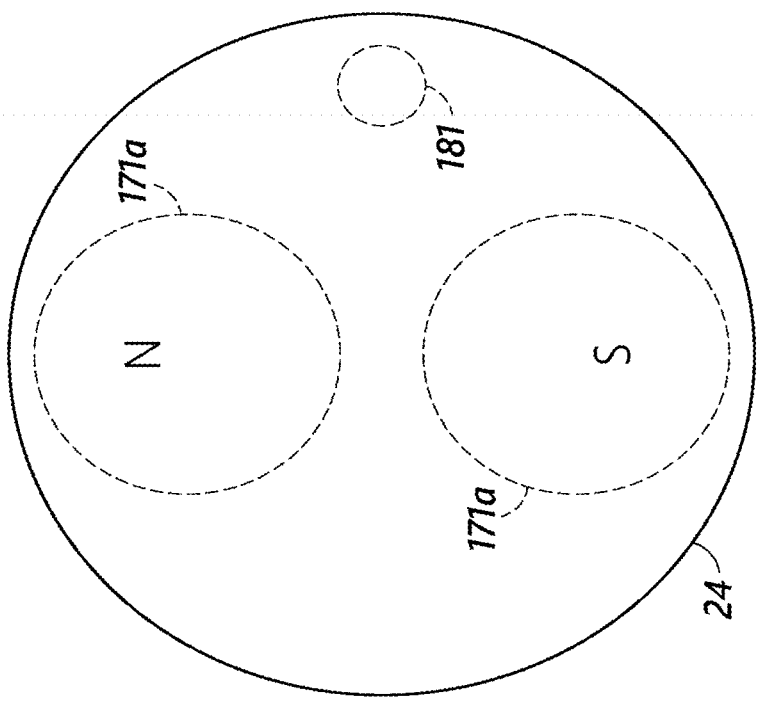
FIG. 10B

METHOD FOR FOAMING A BEVERAGE

INCORPORATION BY REFERENCE TO ANY PRIORITY APPLICATIONS

This present application is a division of U.S. patent Ser. No. 16/124,048, filed Sep. 6, 2018, the disclosure of which is hereby incorporated by reference in its entirety.

FIELD

The present disclosure relates to systems and methods for preparing beverages, such as systems and methods for foaming a milk or a milk product with steam.

DESCRIPTION OF CERTAIN RELATED ART

The process of steaming milk is well known part of creating certain café beverages. In most applications, a steam wand is immersed into a milk or milk product that is held within a container assembly. The steam can heat the milk and by varying the depth of the steam wand in the milk the user can generate froth in and/or over the milk. The heated and frothed milk can be added to beverage ingredients (e.g., espresso) to create certain café beverages. While such known techniques are useful, there is a continued desire to improve the quality of the final milk product and the process of creating the milk product.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

FIG. 4 illustrates a simplified schematic view the beverage preparation system of FIG. 1A.

FIG. 10A depicts a schematic view of the orientation of magnets which can be disposed within a pitcher and seat of a beverage preparation system.

FIG. 10B depicts a schematic view of the orientation of magnets which can be disposed within a pitcher and seat of a beverage preparation system.

DETAILED DESCRIPTION OF CERTAIN EMBODIMENTS

Various beverage preparation systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein. In many of the embodiments described herein, the beverage preparation system is described as heating and/or creating foam within milk or a milk product by adding steam and/or air to the milk or milk product. However, it should be appreciated that certain features and aspects of the embodiments disclosed herein may be applicable to other beverages besides milk or milk product and thus the description herein is not limited to milk or milk products. In addition, certain embodiments are directed to a method and apparatus that utilizes temperature to estimate the volume of liquid contained within a container. In certain embodiments, such methods can be utilized and applied to beverage preparation systems configured in different manners.

Although certain aspects, advantages, and features are described herein, it is not necessary that any particular embodiment include or achieve any or all of those aspects, advantages, and features. Some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Figure 1A:
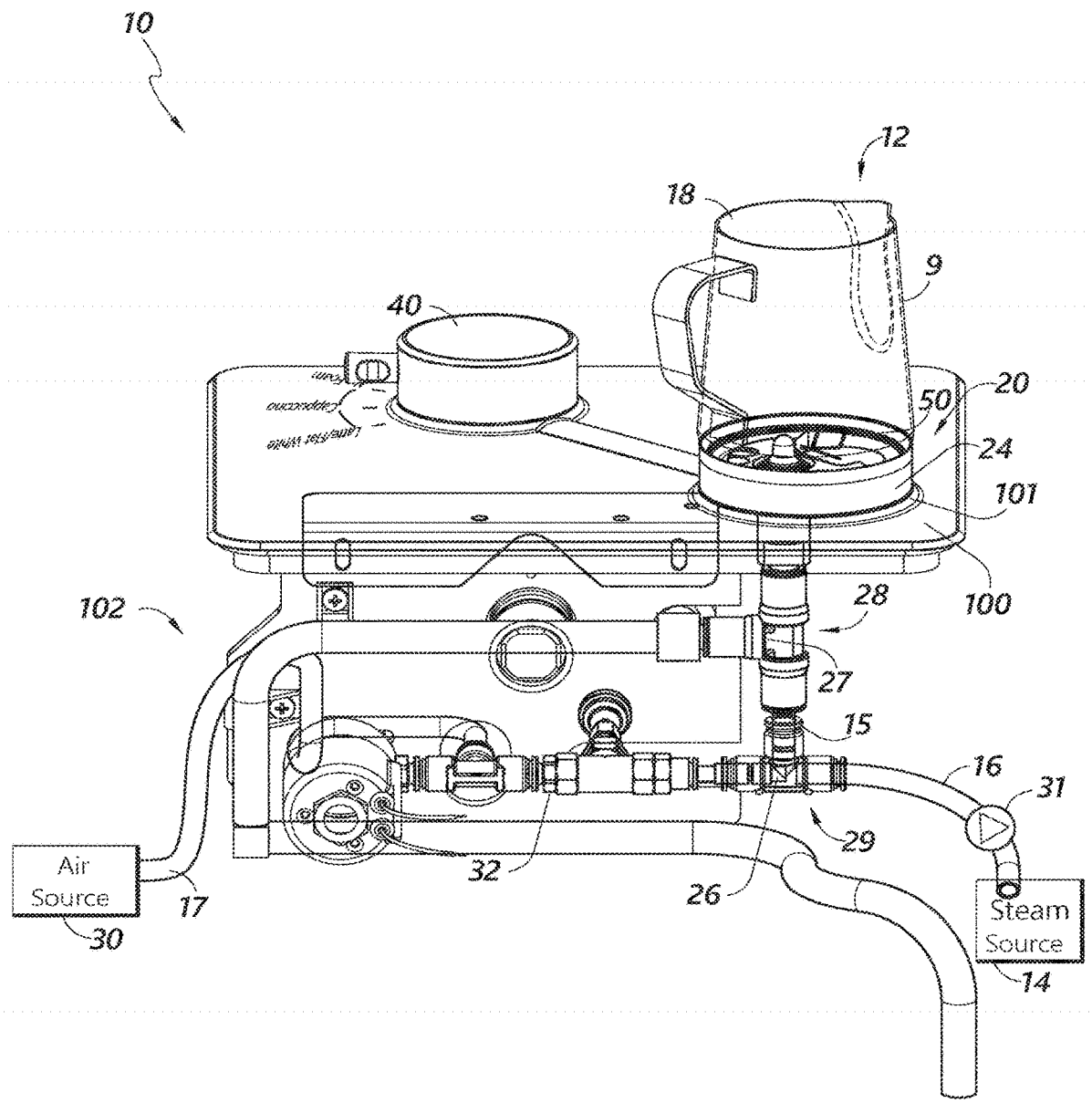
FIG. 1A is top perspective view of a beverage preparation system.
Figure 1B:
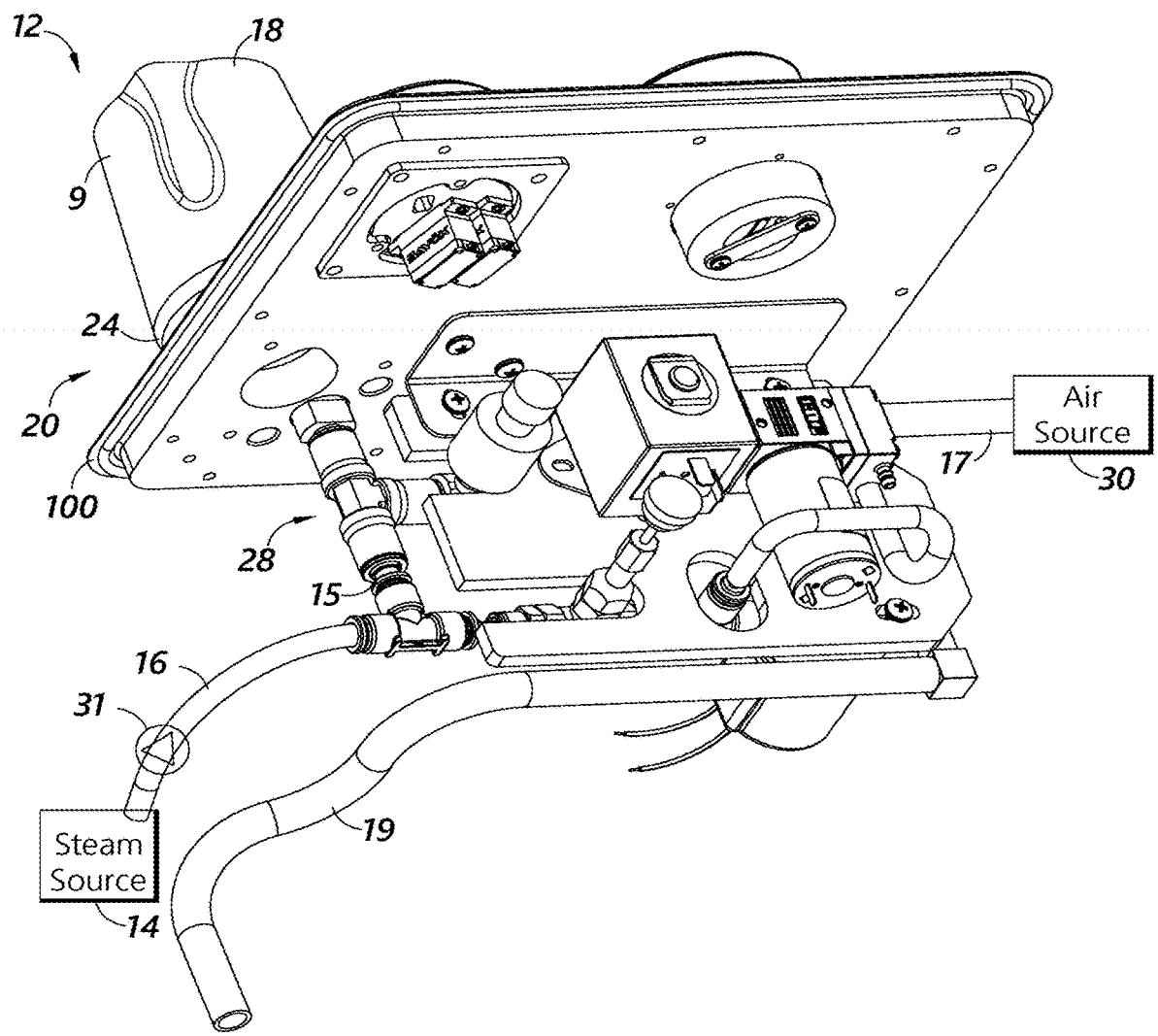
FIG. 1B is a bottom perspective view of the beverage preparation system of FIG. 1A.

FIG. 1A illustrates an embodiment of a beverage preparation system 10. To facilitate presentation, the system 10 is discussed in the context of foaming milk and/or a milk product that can be used to create café beverages such as, for example, a latte or cappuccino. However as noted above, certain features and aspects of the disclosure can be applied in other contexts as well, such as heating and/or creating foam in other types of products and/or creating other types of liquid food products, which may include beverages, soups, broths, creams, purées, and the like.

Figure 1C:
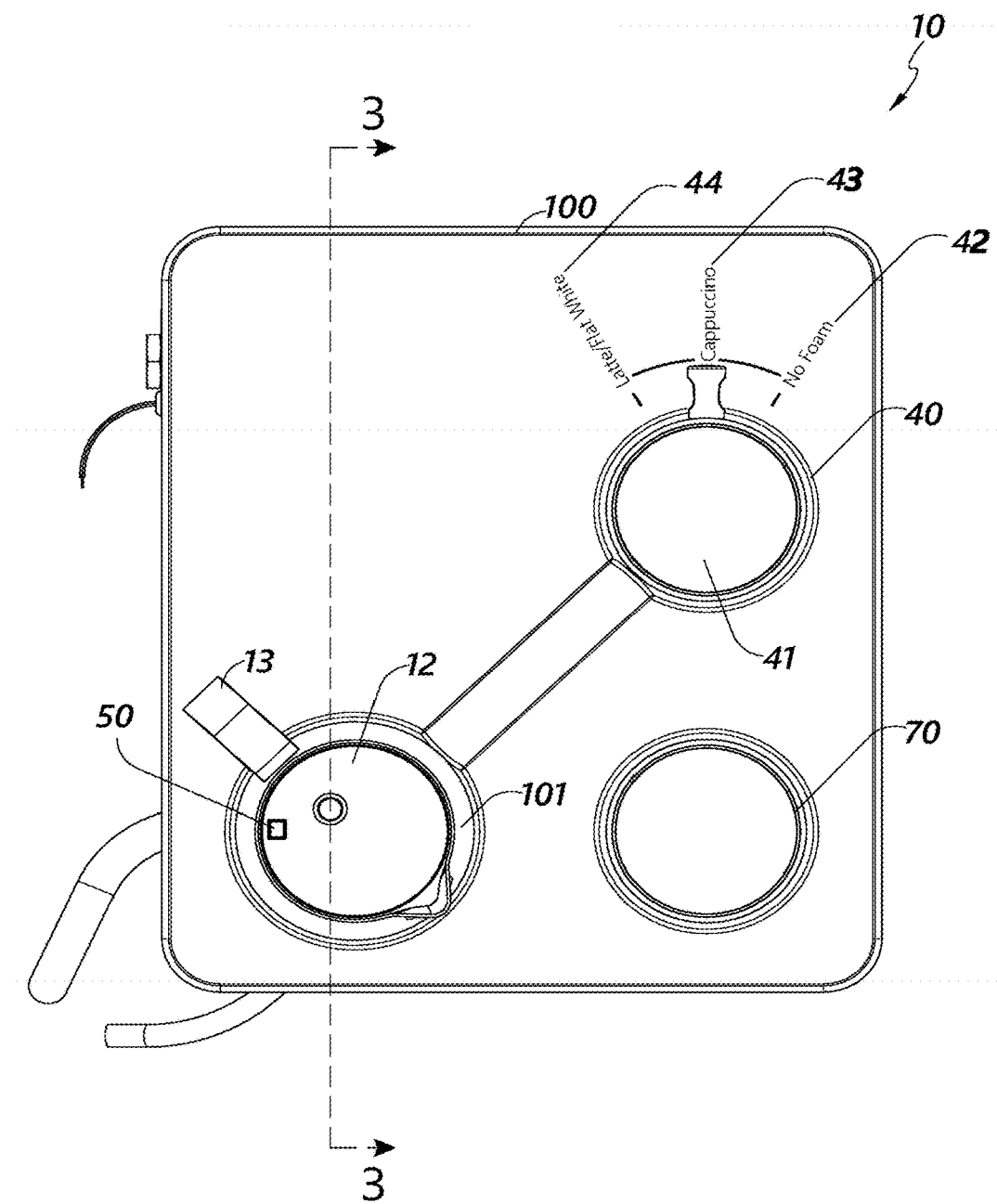
FIG. 1C is a top view of the beverage preparation system of FIG. 1A

As illustrated, the system 10 can include a container assembly 12. In the embodiment illustrated in FIG. 1A, the container assembly includes a pitcher 9. In various configurations, the pitcher 9 may be implemented in a variety of forms, such as a cup, jug, carafe, decanter, or any suitable apparatus for containing a liquid. The pitcher 9 may be constructed from a variety of materials including glass, plastic, metal, and other generally non-permeable materials suitable for holding liquid. In certain embodiments, the pitcher 9, or indeed, the entire container assembly 12, may be made from stainless steel, or another suitable metal. The pitcher 9 can include a handle 13. In certain configurations, the handle 13 may be disposed on the exterior of the container assembly 12. In this manner, the handle 13 may facilitate transport and handling of the container assembly 12. As depicted in FIG. 1C, the pitcher 9 further includes a generally open first or upper end 18 through which a liquid may be introduced into the interior of the container assembly 12.

As further depicted in FIG. 1A, a closed second or lower end 20 is disposed generally opposite the open first or upper end 18. The closed lower end 20 of the pitcher 9 can be coupled to a base assembly 24 (also referred herein as "base"). The base assembly 24 can house certain components of the container assembly 12.

Figure 11:
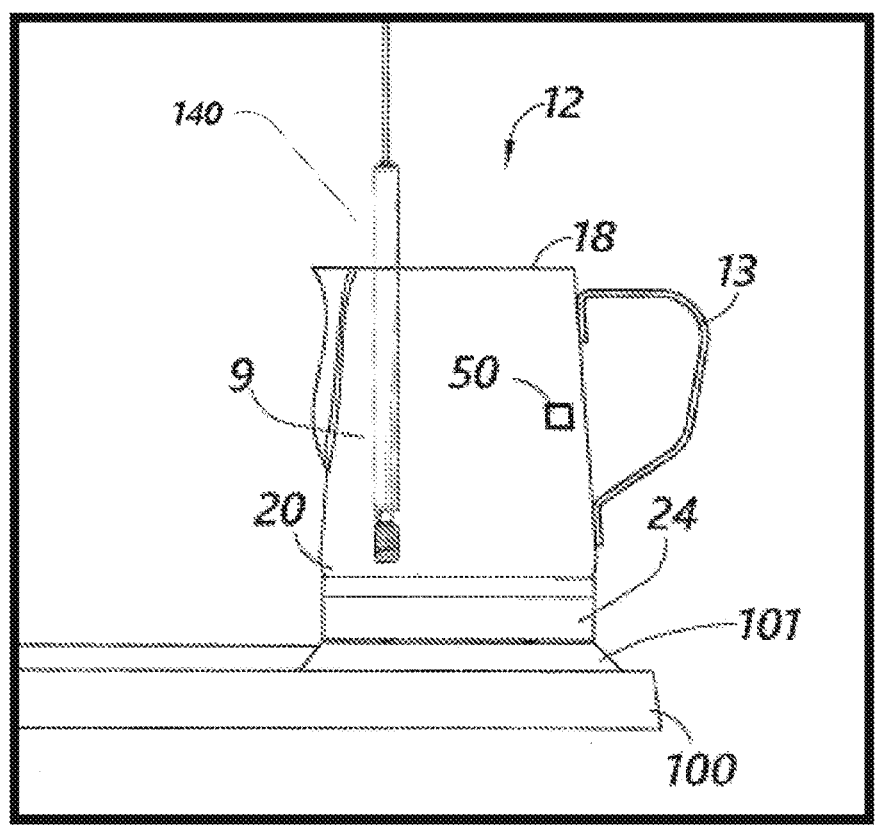
FIG. 11 depicts a schematic view of an embodiment of a beverage preparation system configured to receive a flow of air and/or steam through the upper end of a container assembly.

Also depicted in FIG. 1A is a temperature sensor 50. In various configurations, the temperature sensor 50 may be disposed such that the temperature sensor 50 is in fluid communication with the interior of the pitcher 9, such that temperature sensor 50 may detect the temperature of a fluid residing within the interior of the pitcher 9. For instance, as depicted in FIG. 1A, the temperature sensor 50 is disposed within the interior of the pitcher 9 generally near or within the closed lower end 20. However, it will be appreciated that the placement of the temperature sensor 50 is not so limited. For instance, in various configurations, the temperature sensor 50 may be disposed within the base assembly 24, as depicted in FIG. 4. In certain configurations, the temperature sensor 50 may be disposed along a sidewall of the pitcher 9, as depicted in FIG. 11. In still further embodiments, the temperature sensor 50 can be coupled to a separate element such as a probe or wand that is inserted into the pitcher 9. In certain configurations, the temperature sensor 50 may further include a wireless transmitter configured to transmit information relating the temperature of the product contained within the container assembly 12.

Temperature sensor 50 may be leveraged to provide additional capabilities to the beverage preparation system 10. For instance, in some embodiments, the system 10 can be configured to prevent the initiation of an aeration and/or heating operation if communication with the temperature sensor 50 cannot be established. Likewise, the system 10 can be configured to terminate an ongoing aeration and/or heating operation if communication with the temperature sensor 50 is interrupted. Similarly, in certain configurations, the system 10 can be configured to modify the parameters of an ongoing aeration and/or heating operation based on detected characteristics of the liquid residing within the interior of container assembly 12. In various configurations, the system 10 may be configured to automatically modify the parameters of an ongoing aeration and/or heating operation if the temperature of the liquid residing within the interior of container assembly 12 exceeds operational parameters. For instance, system 10 may be configured to automatically reduce the rate of steam flow where temperature sensor 50 reports that the temperature of the liquid residing within the interior of container assembly 12 is near boiling. In a similar manner, system 10 may automatically increase the rate of steam flow where temperature sensor 50 reports that the temperature of the liquid residing within the interior of container assembly 12 is not increasing at a sufficient rate. In various configurations, beverage preparation system 10 may automatically optimize a given procedure to account for variations in the production process, such as variable volumes of fluid residing within the interior of container assembly 12, as will be explained more fully below.

Figure 2:
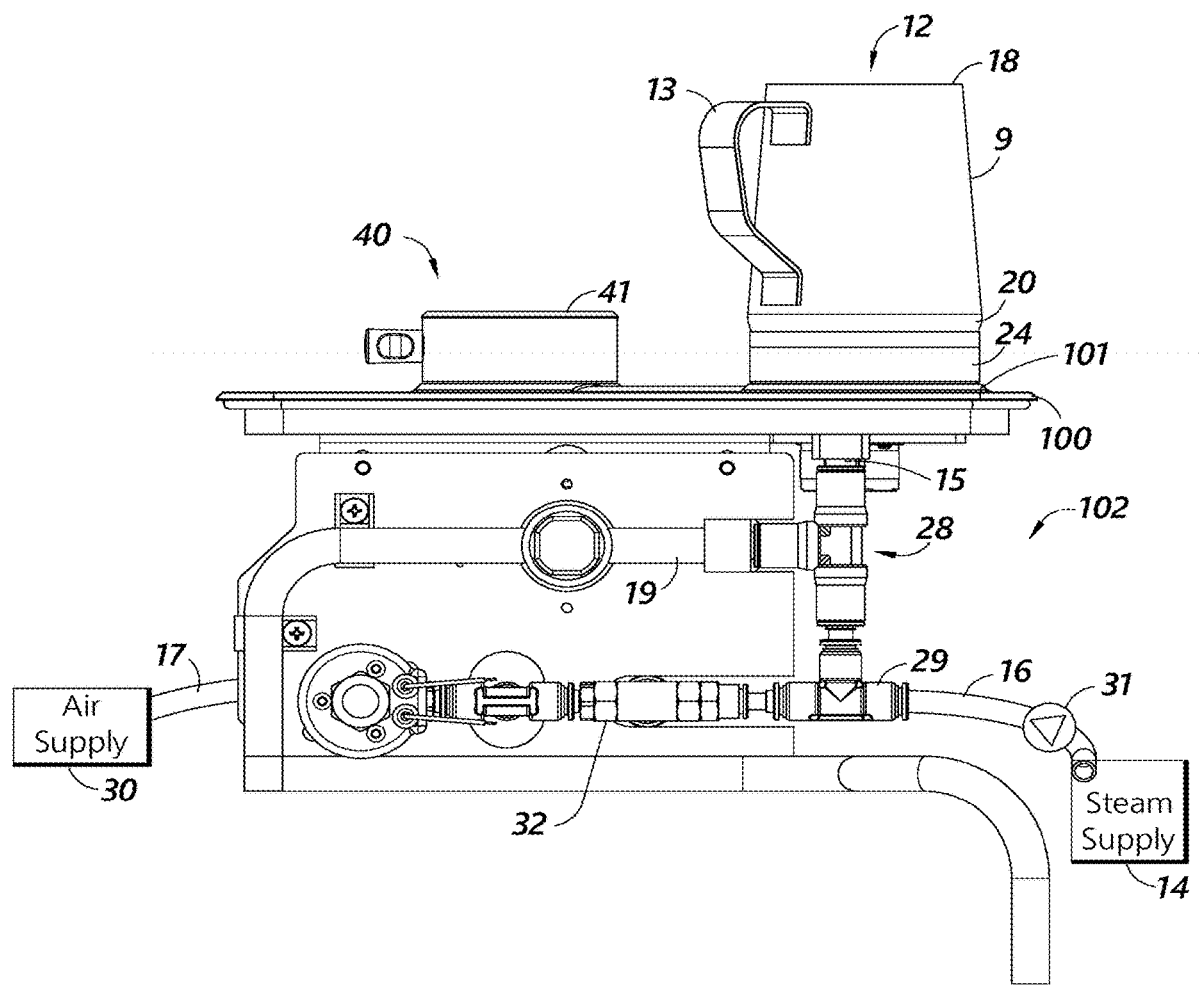
FIG. 2 depicts a side view of the beverage preparation system of FIG. 1A
Figure 3:
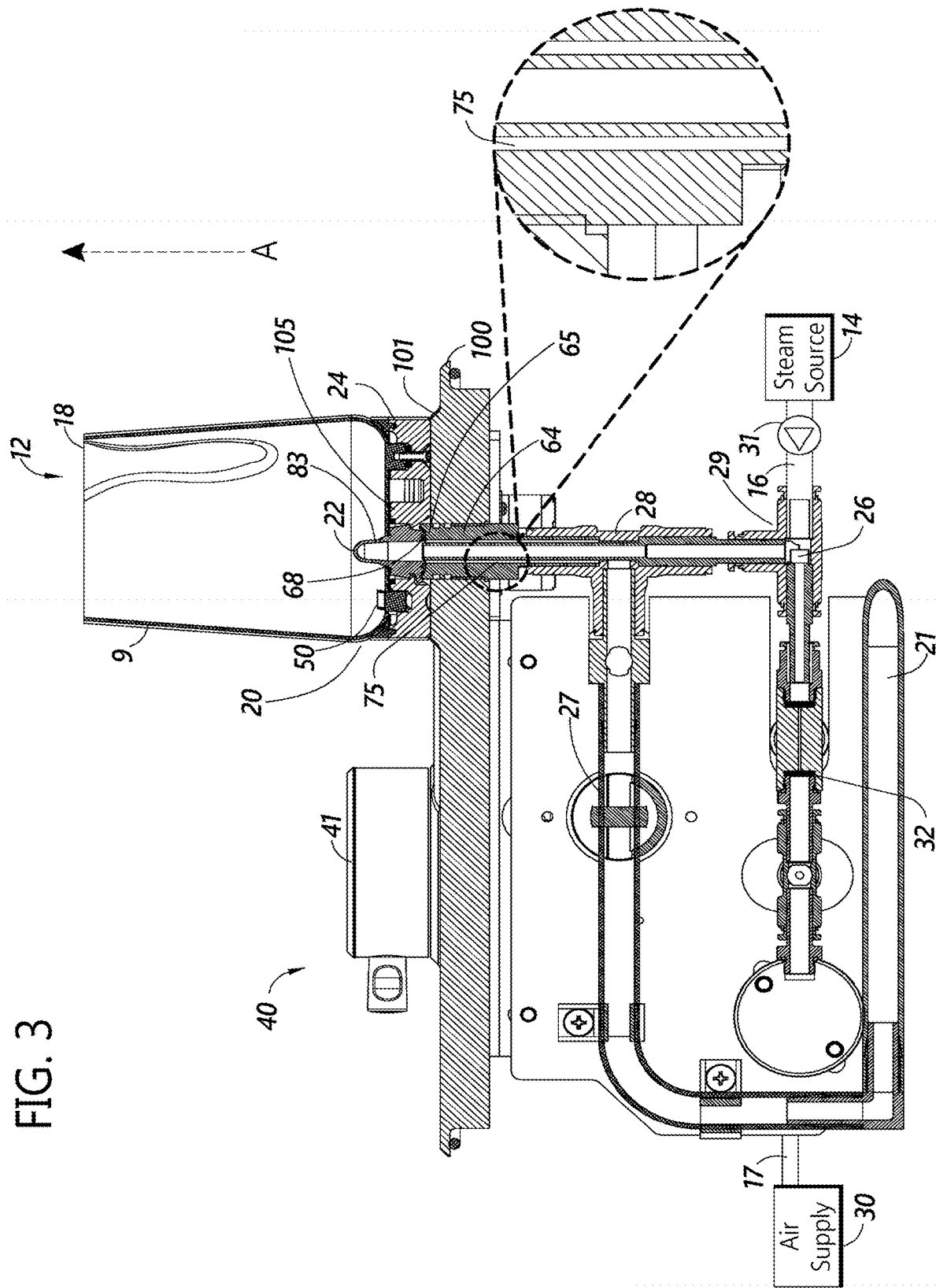
FIG. 3 illustrates a partial cross-sectional view of the beverage preparation system of FIG. 1A

The container assembly 12 is supported by the base assembly 24 on the platform 100. It will be appreciated that platform 100 may support additional components of the beverage preparation system 10. For instance, as illustrated in FIG. 1C, platform 100 may support one or more of a user interface 40 and a display 70, among other possible components. Moreover, the steam supply system 102, which may include both the steam source 14 and the air supply 30, can be positioned below or partially below the platform 100, as depicted in FIGS. 2 and 3. Accordingly, in certain implementations, a user of the system 10 may utilize the user interface 40 to selected desired finished beverage characteristics, such as temperature and degree of aeration, while the actual components of the steam supply system 102 can be positioned below the platform 100 and out of view of the user. Nevertheless, the user may monitor the activity of the various components of the steam supply system 102 through display 70. Since the steam supply system 102 may be housed beneath the platform 100, base assembly 24 may be configured to allow a flow of air and/or steam to pass from the steam supply system 102 disposed beneath the platform 100, into the container assembly 12 above the platform, as best depicted in FIG. 3.

Figure 6:
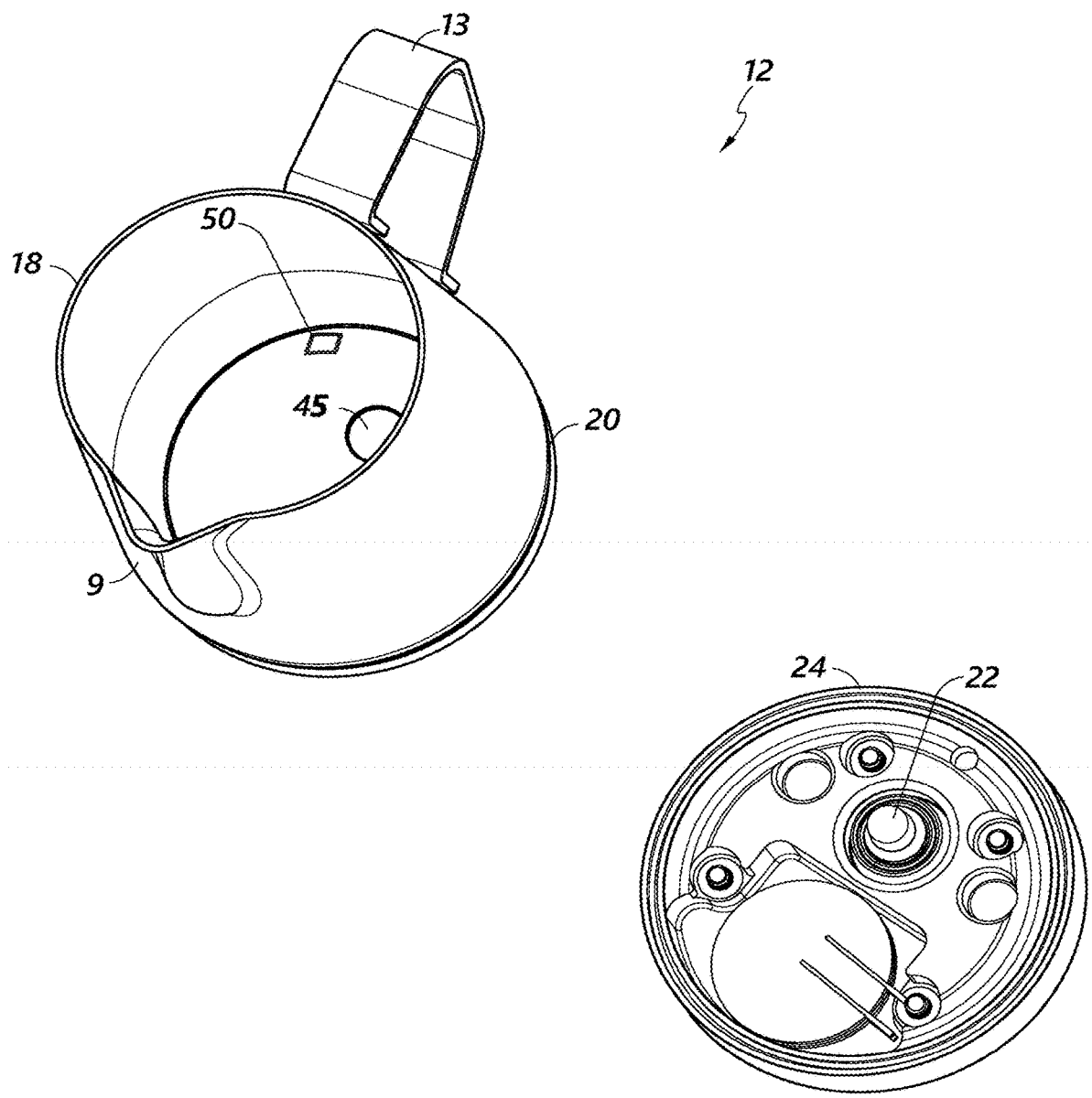
FIG. 6 is an exploded view of an embodiment of a container assembly.

With continued reference to FIG. 3, the base assembly 24 may be configured to allow a flow of steam and/or air to flow from beneath platform 100 into container assembly 12 above platform 100 through nozzle 22. As shown in FIG. 3, the nozzle 22 may be disposed within base assembly 24, but configured to extend into container assembly 12 through an opening 44 disposed on the generally closed lower end 20 of container assembly 12. The opening 44, through which the nozzle extends, can be configured to include a sealing member (e.g., an O-ring, gasket, or other type of seal) configured to provide a generally liquid-tight seal between the container assembly 12 and the base assembly 24. As best shown in FIG. 6, the second end 20 of the container assembly 12 comprises the opening 44, though which the nozzle 22 extends. On the opposite side of opening 44, nozzle 22 rests on the valve seat 64. In this manner, valve seat 64 can provide an interface that connects the nozzle 22 to a steam supply system 102 (also referred to as "steam supply" or "steam supply unit"), which may be configured to include at least one of a steam source 14 and an air source 30. In certain arrangements, steam and/or air can flow up through the valve seat 64, into the nozzle 22, and then into the interior of the container assembly 12 to heat and/or aerate liquid (e.g., milk or a milk product) contained within the container assembly 12. Advantageously, a liquid tight seal may be formed between nozzle 22 and valve seat 64 to prevent fluid resident in the container assembly 12 from escaping out of the bottom end 20 through the opening 44 towards base assembly 24.

Figure 5A:
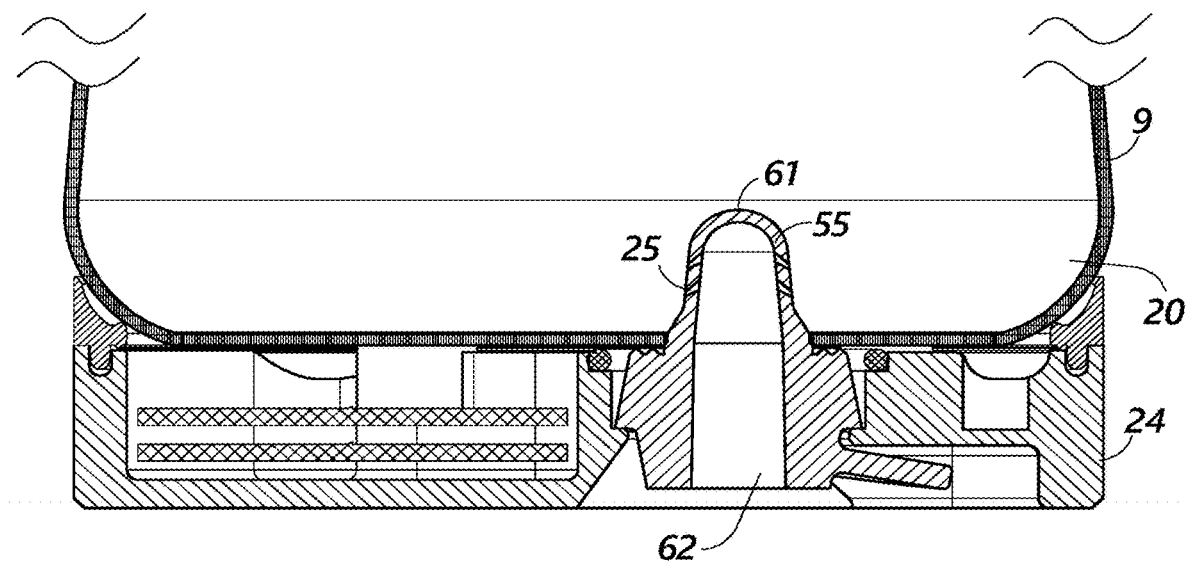
FIG. 5A is a cross-sectional side view of a lower portion of an embodiment of a container assembly that can be used with the beverage preparation system of FIG. 1A.

Depicted in FIG. 5A is a detailed view of the bottom end 20 (e.g., bottom) of the container assembly 12, including the nozzle 22. The nozzle can be formed of an elastomeric material and in some embodiments can be formed of a single piece of elastomeric material. As shown in FIG. 5A, the nozzle 22 can have a first or upper end 61 that extends into the interior of the container assembly 12. The upper end 61 of nozzle 22 may be rounded. The nozzle 22 may further include a second or bottom end 62, which can form an opening at the bottom of the base assembly 24. The bottom end of the nozzle 22 can form a gasket 68, which can mate with a top surface 65 of the corresponding valve seat 64 in the platform 100, best seen in FIG. 3. In certain embodiments, the nozzle 22 can include the slits or apertures 25 that in certain embodiments can function as one-way valves. Thus, the liquid in the interior of the pitcher 9 can be inhibited or prevented from escaping out of the second or bottom end 20 of pitcher 9 when disengaged from the base assembly 24.

Figure 5B:
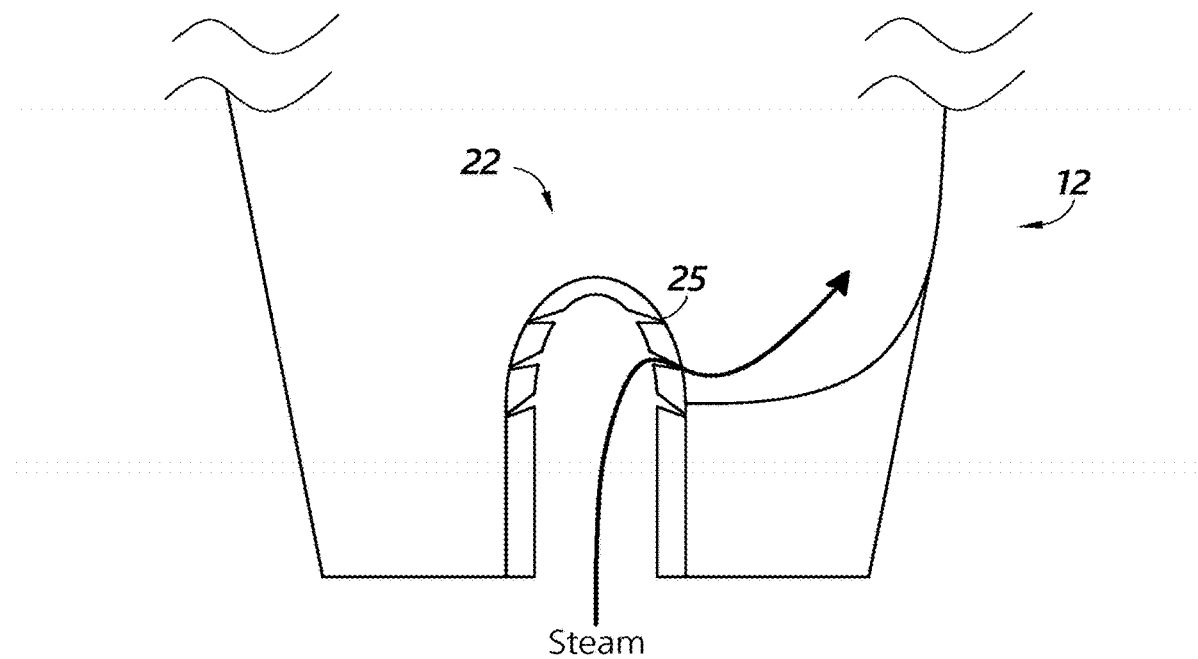
FIG. 5B is a cross-sectional side view of a lower portion of another embodiment of a container assembly that can be used with the beverage preparation system of FIG. 1A.

Depicted in FIG. 5B is a close-up view of an embodiment of the slits 25 discussed above. In some embodiments, the slits 25 allow gas and vapor received into the nozzle 22 to proceed into the interior of container assembly 12. As depicted in FIG. 5B, the slits 25 can be oriented to direct the flow of gas and vapor substantially horizontally outwards. In various additional configurations, the slits 25 can be configured to direct the flow of gas and vapor substantially downwards towards the bottom end 20, and perimeter of the pitcher 9 and can be in the form of downward slits 25 formed in the wall 55 of the nozzle 22. Directing the flow of steam and/or air may allow the liquid residing in the container assembly 12 to be heated and/or aerated in a more uniform manner.

Figure 5C:
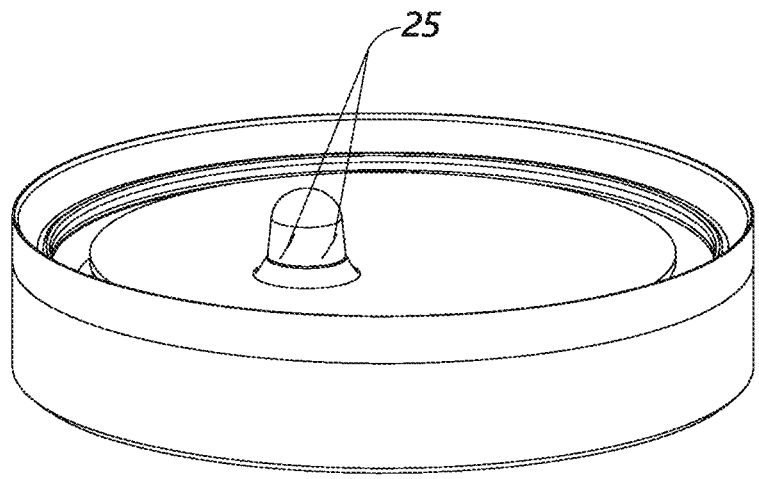
FIG. 5C is a perspective view of an embodiment nozzle that can be with an embodiment of a container assembly.
Figure 5D:
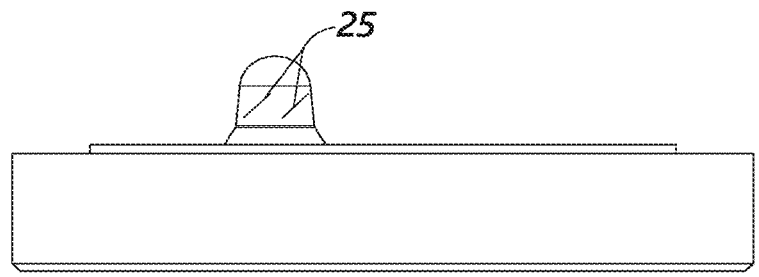
FIG. 5D is a perspective view of an embodiment nozzle that can be with an embodiment of a container assembly.

As shown in FIG. 5C, the nozzle 22 can include apertures which can comprise slits 25 through which air and/or steam may flow into the interior of container assembly 12. Likewise, depicted in FIG. 5D is a side view of nozzle 22 where the slits 25 can be seen. The slits 25 can be configured to open or "crack" at a selected pressure. For instance, in some embodiments, the nozzle 22 can be configured to inhibit the flow of gas or until the flow has reached a certain minimum threshold pressure by modifying the size and configuration of the various slits 25 disposed on nozzle 22. Thus, in certain embodiments, the slits 25 remain closed until the pressure increases above a threshold value. Once the pressure exceeds the threshold value, the slits 25 can open to allow steam and/or air to enter the container assembly. In one embodiment, the threshold pressure for opening the slits 25 is about 1 psi. In this manner, the nozzle 22 can operate as a check valve that only allows steam and/or air to enter into the container assembly 12 if the pressure in the nozzle 22 exceeds a certain threshold. For instance, as depicted in FIG. 5A, the nozzle 22 includes a plurality of slits 25 that are configured to crack open at a selected pressure. Likewise, FIG. 5B depicts the plurality of slits 25 cracked open in response to a flow of air and/or steam of sufficient pressure. In the illustrated embodiment of FIGS. 5C and 5D, the slits 25 can have horizontal axis and can extend at a 45 degree orientation on the nozzle 22.

As noted above, in FIGS. 5C and 5D, the slit 25 is disposed along a horizontal axis but can extend along a 45 degree orientation on the nozzle 22. In modified embodiments, the slits 25 can direct flow downwards as mentioned above, upwardly and/or horizontally. Such slits 25 can also extend along the nozzle at 45 degrees orientation along the nozzle, vertically and/or horizontally in various embodiments. In this manner, the flow of steam from steam source 14, and the flow of air from air source 30, may be controlled and directed by the nozzle as the flow proceeds into the interior of container assembly 12.

To further control the flow of steam and/or air, various additional valves may be implemented within steam supply system 102. For instance, in various configurations, the steam source 14 can be provided with a steam valve 31 to control the amount of steam flowing into a steam supply conduit 16. In one configuration, the steam valve 31 may be a proportional solenoid valve. In a similar manner, the air source 30 can be provided with an air valve 32, which may be used to control the amount of air flowing through an air supply conduit 17. In certain configurations, the air valve 32 may be a needle valve. However, it will be appreciated that either of the steam valve 31 or the air valve 32 may be implemented in a variety of mechanisms suitable for permitting, modulating, restricting, or terminating a flow of a gas and/or vapor through a conduit. For instance, air valve 32 or steam valve 31 may comprise ball valves, diaphragm valves, butterfly valves, relief valves, gate valves, and any other suitable implementation.

With continued reference to FIG. 3, the steam supply conduit 16 and the air supply conduit 17 can be connected to a main supply conduit 15 by a T-connection 29. In turn, the main supply conduit 15 may be connected to the valve seat 64 to facilitate the introduction of steam and/or air into the container assembly 12 through the nozzle 22. As best seen in FIG. 3, within the T-connection 29, a one-way valve 26 can be provided at the outlet to the air supply conduit 17. In one embodiment, the one-way valve 26 is in a duck-bill valve. The one-way valve 26 can prevent steam from the steam source 14 from flowing down the air supply conduit 17 towards the air source 30. In the embodiment depicted, the one-way valve 26 is positioned within the T-connection 29 near or below the inlet to the air and steam supply conduit of T-connection 29. By positioning, the one-way valve 26 within the T-connection near or below the inlet to the air and steam supply conduit, lingering air that may be resident in the T-connection, as well as air resident in the steam and air conduit 15, can optionally be purged from the passageway, as will be explained in more detail below. Such an arrangement helps to prevent the formation of undesirable large air bubbles in the container assembly 18.

The air and steam conduit 15 can extend upwardly through the valve seat 64 to form a steam outlet 83 at the upper surface 105 of the base assembly 24. In certain configurations, the valve seat 64 can also form an exhaust path 19. For example, in the embodiment illustrated in FIG. 3, the exhaust path 19 is formed by an annular gap 75 that extends around the main supply conduit 15 forming an exhaust inlet on the base assembly 24 through the valve seat 64. As shown in FIG. 3, the exhaust path 19 can be connected to an exhaust fitting 28, which in turn is connected to an exhaust conduit 21. The exhaust conduit 21 may be opened or closed to facilitate or inhibit the flow of steam and/or air into the exhaust path 19 using the exhaust valve 27. The exhaust valve 27 may be used to close the pathway to the exhaust conduit 19, thereby producing a build-up of pressure within the steam and air conduit 15. In a similar manner, the exhaust valve 27 may opened to allow steam, air, or a combination thereof, to flow into the exhaust path 19, thereby reducing the pressure in the steam and air conduit 15.

Advantageously, the foregoing configuration allows air to be purged from the main supply conduit 15 either before or after operation of the system 10 by leveraging the interaction between the nozzle 22, apertures 25, and exhaust path 19. For instance, when the pinch valve 27 in the exhaust conduit 19 is in an open position, the steam and/or air flowing up from through the steam and air conduit 15 will not "crack" open the openings in the valve. In this manner, steam and air is directed up towards the nozzle 22 and then down through the annular exhaust gap 75, through the exhaust conduit 19. Conversely, when the valve 27 in the exhaust conduit 19 is closed, pressure at the nozzle 22 will increase until the apertures 25 in the nozzle "crack" or open. In this manner, the exhaust valve 27 can be used in conjunction with slits 25 of nozzle 22 to allow steam and air conduit 15 to be purged of latent air or steam resident in the pathways from previous operation cycles. For example, by routing the flow of steam and/or air away from the nozzle 22, the air resident in the air and steam conduit 15 may be expelled from the passageway. Afterwards, the exhaust valve 27 can be closed to begin directing higher pressure steam and air to the container assembly 12. In various configurations, system 10 may be configured to automatically purge the main supply conduit 15 of latent gas and/or vapor prior to the initialization of an aeration and/or heating operation, or after an aeration and/or heating operation has been completed.

The platform 100 can include a display 70, as depicted in FIG. 1C. The display 70 may be implemented in a wide variety of configurations. For instance, in one embodiment, the display 70 can comprise a gauge with one or more dials. In other embodiments, the display 70 can be located in other positions, and in certain embodiments, can be remote from the container assembly 12 or platform 100. The display 70 can display information regarding various physical properties of the liquid residing within container assembly 12. For instance, the display 70 can display the temperature of the liquid residing within the container assembly 12, as detected by temperature sensor 50. Similarly, the display 70 may display information regarding duration or amount of air, steam, or a combination thereof delivered to the container assembly 12.

In certain configurations, the display 70 can be viewed by a user of the system to observe certain characteristics of the liquid residing in the container assembly 12. For instance, the display 70 may be configured to depict the temperature of the liquid residing in the container assembly 12, as reported by temperature sensor 50. Likewise, in certain configurations, the display 70 can be configured to display the duration of air or steam delivery. For instance, in certain configurations the display 70 can be configured to activate when a flow of air is initiated through the T-connection 29 to display the duration of air delivery.

Figure 7:
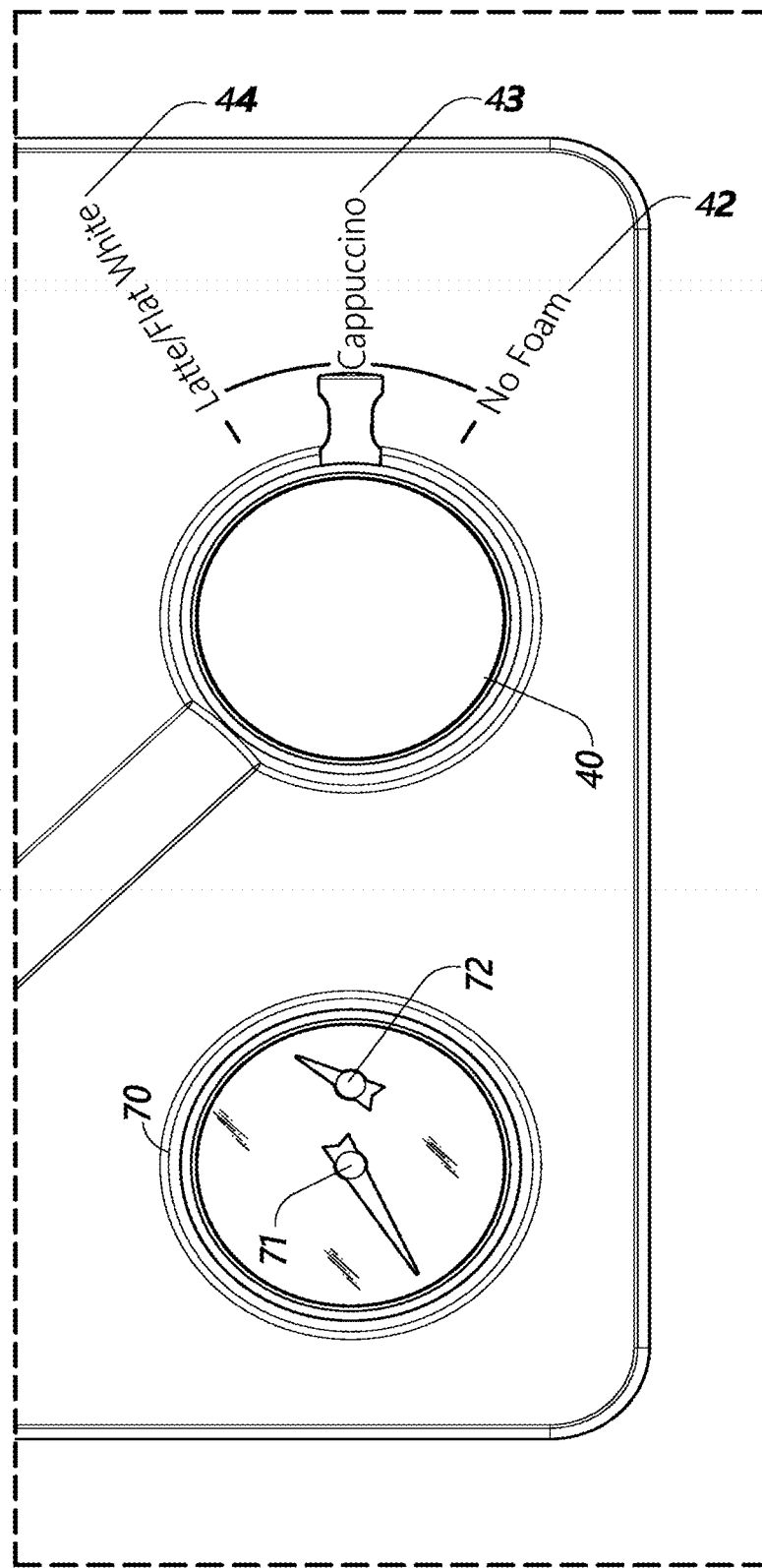
FIG. 7 depicts a top view of a user interface and display for use in an embodiment of a beverage preparation system.

Display 70 is depicted in FIG. 7 as a gauge. FIG. 6 also illustrates the display 70, which in the illustrated embodiment can be in the form of a gauge with two dials 71, 72 (described in more detail below). The gauge 70 may display various characteristics of the liquid residing in the container assembly. For instance, the gauge in FIG. 7 is configured to include a temperature dial 71 and time dial 72. Specifically, the temperature dial 71 is configured to depict the temperature of the liquid residing in dispensing unit, for instance, as detected by temperature sensor 50. Likewise, the time dial 72 is configured to depict the air pump's duration of operation. By referencing display 70, it is possible for a user of the system to determine if the optimal temperature of the liquid residing in the container assembly 12 has been reached, and to estimate the foam characteristics of the liquid based on the air pump's displayed period of activity. However, the display 70 may be implemented in a variety of manners to show various additional characteristics of the liquid. For instance, the display 70 may be configured to depict the pressure of the liquid residing in dispensing unit. In addition, in modified arrangements, the dials can be replaced with digital displays or bars or other visual indicators.

Platform 100 may also include a user interface 40. The user interface 40 can allow a user to control operation of the system 10 to alter the physical characteristics of a liquid residing within container assembly 12. For instance, in certain configurations, the user interface 40 can be manipulated to module, regulate, or otherwise control a flow of steam and/or air from the steam supply system 102 into the container assembly 12. The flow of steam and/or air may heat and/or aerate the liquid residing in the container assembly 12. In some embodiments, the user interface 40 may present a user with a simplified control scheme that allows a user to select desired characteristics of the finished beverage, and the system 10 may automatically initiate an appropriate heating and/or aeration protocol to achieve the desired characteristics without further user intervention.

FIG. 7 depicts a user interface 40 that can be used to regulate the flow of gas and/or vapor through the system 10. As depicted in FIG. 7, the user interface 40 can be implemented as a dial or knob having a plurality of predefined selection points. In the embodiment depicted in FIG. 7, user interface 40 has three predefined selection points consisting of: Latte/Flat White 44, Cappuccino 43, and No Foam 42. However, it will be appreciated that a wide assortment of possible demarcation points may be implemented in a variety of different orders without deviating from the scope of the present disclosure. For instance, in various configurations, the predefined selection points may comprise "No Foam," "Light Foam," "Medium Foam," and "Heavy Foam," among a wide variety other possible configurations. In this manner, a user of system 10 may manipulate the user interface 40 to select a preferred temperature and aeration profile. In turn, the beverage preparation system 10 may automatically control the operation of the steam source 14, steam valve 31, air source 30, air valve 32, T-connection valve 26, and exhaust valve 27 to optimize the flow of steam and/or air into the interior of container assembly 12 to obtain the desired finished beverage characteristics, through the implementation of a control system 150, as will be discussed more fully below.

Figure 9A:
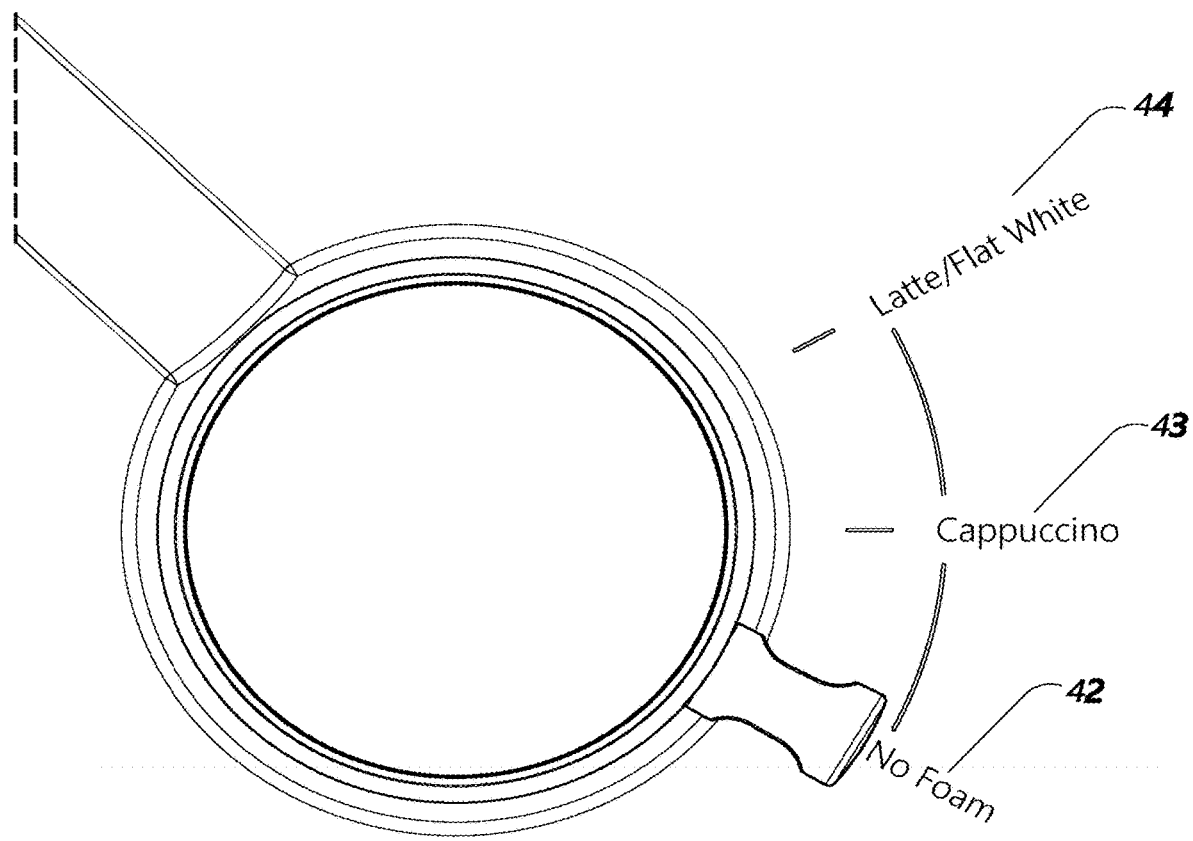
FIG. 9A depicts a first possible operational state of a control knob for use in a beverage preparation system.
Figure 9B:
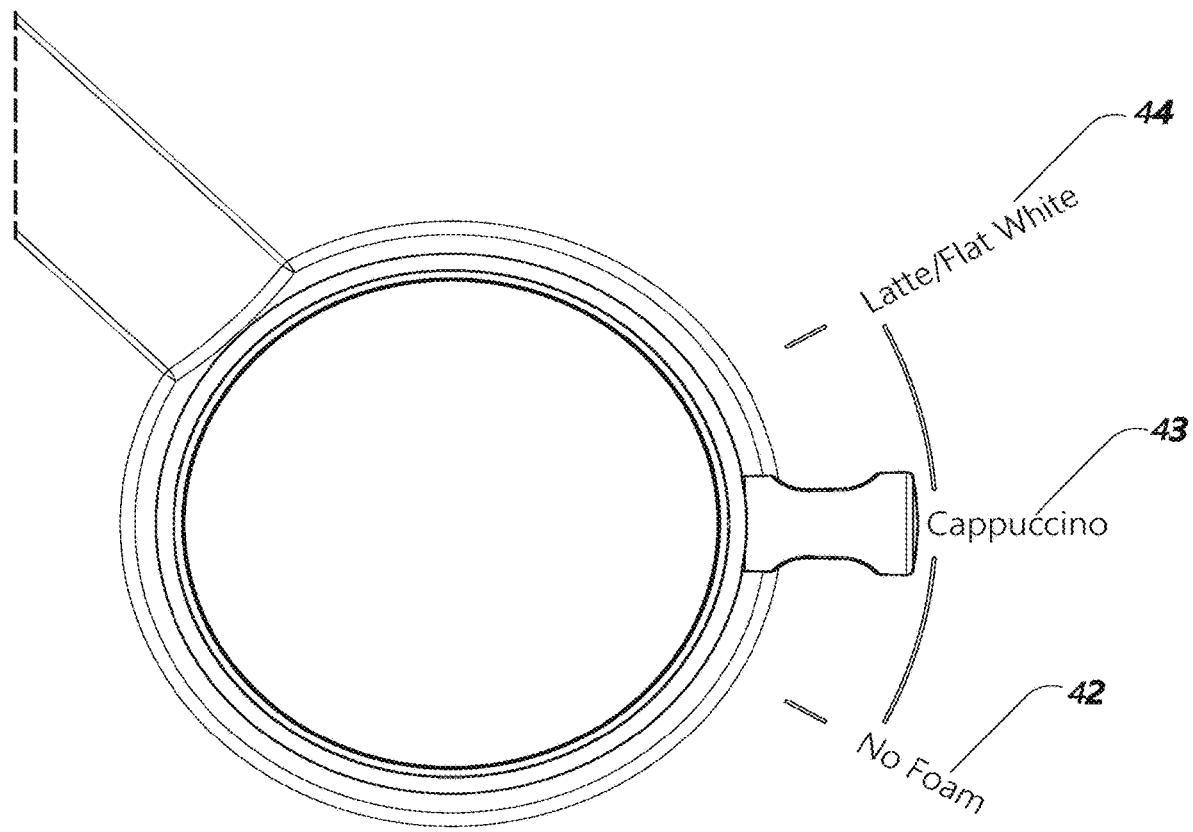
FIG. 9B depicts a second possible operational state of a control knob for use in a beverage preparation system.
Figure 9C:
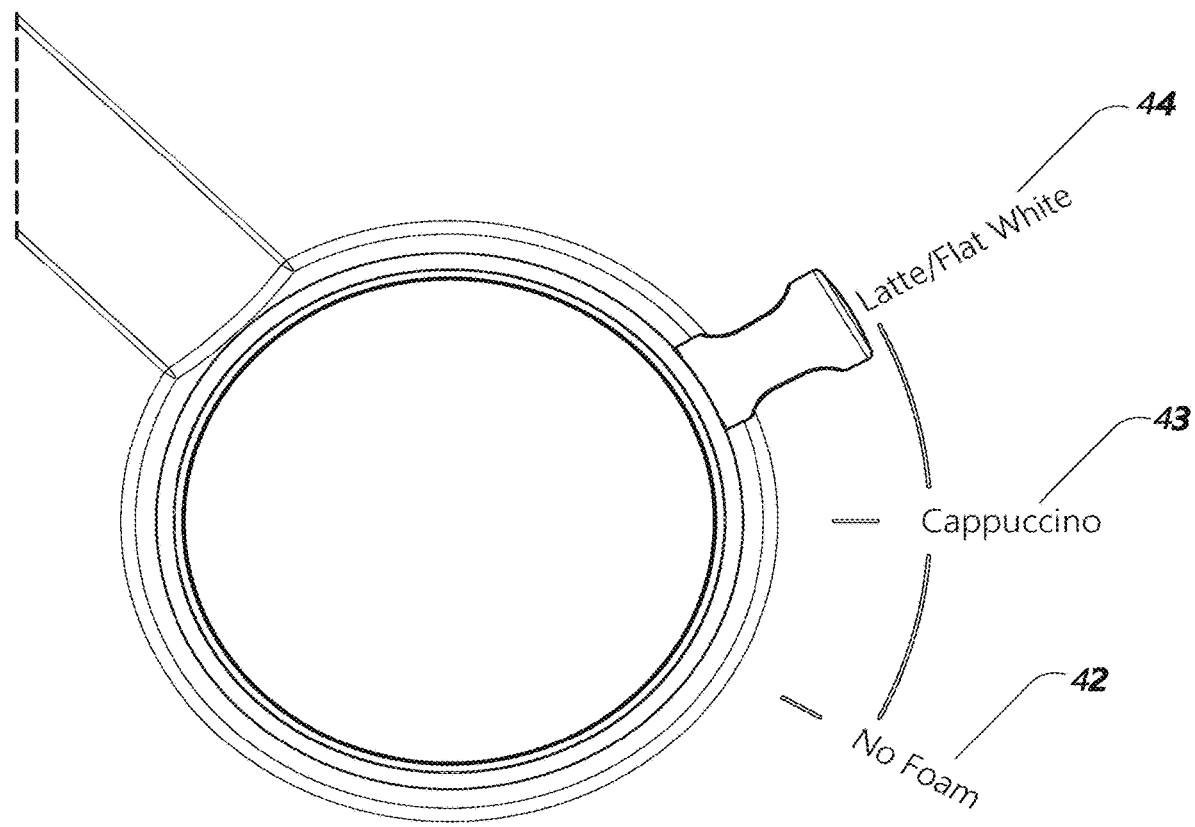
FIG. 9C depicts a third possible operational state of a control knob for use in a beverage preparation system.

Depicted in FIGS. 9A-C are views of the control knob 40 in certain operational positions. As discussed above, a user of the system 10b may use the control knob 40 to initiate, halt, modulate, or otherwise regulate the flow of gas and/or vapor into the dispensing unit. In other configurations, a user of the system 10 may manipulate control knob 40 to select desired finished beverage characteristics, and the system 10 may be configured to automatically initiate an appropriate steaming and/or aeration profile to arrive at the desired characteristics. In this manner, a user of the system may ensure that liquid residing in container assembly exhibits certain desired characteristics, such as a preferred temperature and foam characteristics.

The control knob depicted in FIG. 9A is set to a first position 42 out of a plurality of positions. Position 42 is labeled "No Foam," and may relate to a heating operation having little or no air flow which might otherwise contribute to aeration. In various embodiments, the system 10 can be configured to initiate a flow of steam into the interior of the container assembly 12, while preventing a flow of air from proceeding into the interior of container assembly 12 by modulating the air supply valve 32 to prevent the flow of air from entering the main supply conduit 15. When in position 42, system 10 may be configured to deliver a moderate steam flow to prevent inducing a turbulent flow in the liquid which might otherwise contribute to the formation of a foam layer.

The control knob depicted in FIG. 9B is set to a second position 43 out of a plurality of positions. Position 43 is labeled "Cappuccino." Cappuccino beverages are typically associated with a thick, rich layer of foam overlaying the beverage. Accordingly, in contrast with position 42, in position 43 the system can be associated with a heating and aeration profile configured to impart a substantial layer of foam into the finished beverage. For instance, in position 43, the system may be configured to permit a flow of steam coupled with a large volume of air to proceed into the interior of container assembly 12. In other configurations, the flow of air may be permitted to proceed into the interior of container assembly 12 for a prolonged period of time. For instance, the flow of air may be initiated when the beverage has reached an initial aeration temperature, and allowed to proceed until the beverage has reached a final aeration temperature. In various configurations, the initial aeration temperature may be about 60° F., about 70° F., about 80° F., or any value therein. Likewise, the flow of air may be terminated when the temperature of the beverage reaches a final aeration temperature, such as about 120° F., about 130° F., about 140° F., about 150° F., or any value therein. In this manner, a beverage having a large volume of foam may be produced. Similarly, when in position 43, the system may be configured to permit a turbulent flow of steam to enter the container assembly to contribute to the aeration. In various additional configurations, alternate mechanisms for imparting a desired degree of aeration may be employed. For instance, in one configuration, an air sensor may be utilized to monitor the flow of air entering the interior of the container assembly 12. In this manner, the flow of air may be halted once the air flow sensor has reported that a specified volume of air has been delivered into the interior of the container assembly 12. The specified volume of air may be dependent upon a variety of factors including the desired degree of aeration, and the beverage size. In still further configurations, the system may be configured to deliver a flow of air at a specified flow rate for a specified period of time before halting the flow of air, wherein the specified period of time may be increased or decreased depending on the desired degree of aeration, and the beverage size. Likewise, in various configurations, the specified flow rate may also depend on the desired degree of aeration and beverage size, or in other configurations, a constant air flow rate may be employed and only the flow time is varied.

Likewise, as depicted in FIG. 9C, the control knob can be oriented to a third position 44 out of a plurality of positions. Position 44 is labeled "Latte/Flat White." When in the position 43 of the plurality of positions, the system can be configured to deliver an intermediate flow of steam and air to yield a heated and aerated beverage having a moderate layer of foam, relative to positions 43 and 42. To produce a beverage having a moderate degree of foam, the system 10 may be configured to permit a flow of steam and air to proceed into the interior of the container assembly 12. The system 10 may modulate the flow of air, such that a moderate degree of aeration is achieved. For instance, the system 10 may be configured to deliver a flow of steam, coupled with an intermediate flow of air, relative to positions 42 and 43. For instance, an intermediate flow of air may be less than the flow of air delivered by the system 10 when position 43 is selected, but greater than the flow of air when position 42 is selected. In the same or different embodiments, the system 10 may be configured to produce an intermediate degree of aeration by allowing the flow of air to begin at a greater initial aeration temperature, and persist until the beverage reaches a lower final aeration temperature, relative to position 43. For instance, in various configurations, the system 10 may be configured to permit a flow of air to initiate when the beverage reaches an initial aeration temperature of about 50° F., about 60° F., about 70° F., or any value therein. Likewise, the flow of air may be allowed to persist until the temperature of the beverage reaches a final aeration temperature such as about 80° F., about 90° F., about 100° F., about 110° F., or any value therein. In various additional configurations, alternate mechanisms for imparting a desired degree of aeration may be employed. For instance, in one configuration, an air sensor may be utilized to monitor the flow of air entering the interior of the container assembly 12. In this manner, the flow of air may be halted once the air flow sensor has reported that a specified volume of air has been delivered into the interior of the container assembly 12. The specified volume of air may be dependent upon a variety of factors including the desired degree of aeration, and the beverage size. In still further configurations, the system may be configured to deliver a flow of air at a specified flow rate for a specified period of time before halting the flow of air, wherein the specified period of time may be increased or decreased depending on the desired degree of aeration, and the beverage size. Likewise, in various configurations, the specified flow rate may also depend on the desired degree of aeration and beverage size, or in other configurations, a constant air flow rate may be employed and only the flow time is varied.

It will be appreciated that a variety of control mechanisms can be employed without deviating from the scope of the present disclosure. For instance, in various configurations, the region between positions 43 and 44 may be an analog region wherein an incremental adjustment in the dial may result in an incremental adjustment in the flow rate of air. For instance, in certain embodiments, the control knob may be rotated continuously between position 43 and 44, resulting in a correspondingly continuous increase in the rate of air flow. Likewise, in various configurations, the region between positions 43 and 42 may be an analog region wherein an incremental adjustment in the dial may result in an incremental adjustment in the flow rate of air. In one configuration, the control knob may be rotated continuously between position 43 and 42, resulting in a correspondingly continuous decrease in the rate of air flow. In this manner, it will be appreciated that a user may be provided with a precise degree of control over the desired aeration characteristics without requiring additional preconfigured settings or additional demarcated positions which might otherwise add undue complexity to the beverage production process.

Adaptive Heating Routines

Depicted in FIG. 4 is a schematic view of the beverage preparation system 10 which has been described above. Accordingly, corresponding components of the beverage preparation system 10 shown in FIG. 4 are provided with the same reference numbers as found above and reference can be made to the description above. As shown in FIG. 4, the beverage preparation system 10 includes the container assembly 12 that can be removably interfaced with base 24 supported by seat 101 on platform 100. as shown in FIG. 4, the user interface 40 may be coupled with a control system 150, which in turn may be connected or otherwise coupled to the aforementioned valves to facilitate automatic operation of the beverage preparation system 10.

As noted above, the user interface 40 allows a user to control certain aspects and operations of the beverage preparation system 10. The user interface 40 can be implemented in a variety of configurations, such as one or more dials, knobs, levers, buttons, switches, touchscreens, or other suitable control schemes. The user interface 40 may be in communication with, or otherwise coupled to one or more of the valves discussed above. For instance, in certain configurations, the user interface 40 may be mechanically coupled to at least one of the steam valve 31, the air valve 32, the T-connection valve 26, and/or the exhaust valve 27 to control or regulate the flow of steam and/or air into the container assembly 12. In other embodiments, user interface 40 may be coupled with the control system 150, and in turn, the control system 150 may control the action of the various components of steam supply system 102.

The control system 150 and/or any components thereof may include a computer or a computer readable storage medium or computer readable memory that has stored thereon executable instructions and there can be one or more processors in communication with the computer readable memory that are configured to execute the instructions to implement the operation and implement the various methods and processes described herein. The control system can include computing device that can generally include computer-executable instructions, where the instructions may be executable by one or more computing devices. Computer-executable instructions may be compiled or interpreted from computer programs created using a variety of programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A computer-readable media (also referred to as a processor-readable medium or computer readable memory) includes any non-transitory (e.g., tangible) medium that participates in providing data (e.g., instructions) that may be read by a computer (e.g., by a processor of a computer).

The control system 150 can be coupled to one or more of the display 70, user interface 40, and various components of the steam supply system 102, such as the air valve 32. In this manner, the control system 150 is able to transmit information relating to the status of the air valve 32 to the display 70. Advantageously, this allows the display 70 to display how long air valve 32 has permitted a flow of air to enter steam and air conduit 15. In a similar manner, the control system 150 can be coupled to one or more of steam valve 31, or exhaust valve 27 to monitor and transmit the duration of actuation, thereby allowing a user of the system 10 to determine how long a flow of steam has been allowed to persist, or how long a flow of steam and/or air has been allowed to travel into the exhaust path 19.

Likewise, in the embodiment depicted in FIG. 4, the user interface 40 is in communication with the control system 150. As discussed above, the control system 150 can be configured to control operation of the steam valve 31, the air valve 32, the T-connection valve 26, and the exhaust valve 27. In this manner, the flow of steam and/or air into the container assembly 12 can be controlled by manipulating the user interface 40, which can transmit the user's selection to control system 150. In turn, control system 150 may automatically control the appropriate valves in order to control the supply of air and steam provided to the interior of the container assembly 12 to achieve the desired characteristics in the finished beverage. For instance, user input received through the user interface 40 may be communicated to the control system 150. In response, the control system 150 may automatically open or close the steam valve 31 to increase, decrease, or halt the flow of steam into the T-connection 29. Likewise, control system 150 may automatically modulate the air valve 32 to increase, decrease, or halt the flow of air into the T-connection 29. Similarly, user input received through user interface 40 may be transmitted to the control system 150 which may in turn modulate the exhaust valve 27 disposed within exhaust conduit 19 to control the rate at which steam and/or air is allowed to flow away from nozzle 22, towards the exhaust. Furthermore, in various configurations, the control system 150 can control activation of the air source 30 or the steam source 14. For example, in some configurations, the air source 30 can be an air pump, which is controlled by the control system 150. Likewise, in some configurations, the steam source 14 can be a steam pump under control of the control system 150. In this manner, it is possible for a user of the system 10 to activate or deactivate one or more of the air source 30 and the steam source 14 through control system 150 by manipulating the user interface 40.

In various implementations, the interior of container assembly 12 may be configured to receive a number of different volumes of a liquid in order to produce beverages or other liquid food products of varying volumes. However, as will be appreciated, a preconfigured steaming or aeration profile may not produce the desired temperature or aeration characteristics for all volumes of a liquid food product. For instance, in various implementations where a large volume of liquid is supplied to the interior of the container assembly 12, the steaming and aeration protocols may not supply a sufficient flow of steam and/or air into the interior of container assembly 12. By way of example, the flow of steam may be insufficient to increase the temperature of the large volume of liquid food product by the desired degree, and the flow of air may be insufficient to impart the desired degree of aeration into the large volume of fluid. Likewise, where a small volume of liquid has been introduced into the interior of container assembly 12, a preconfigured flow of steam may allow for a rapid introduction of steam which may result in the temperature of the liquid rising too rapidly. Similarly, a preconfigured aeration protocol may allow for a rapid introduction of air, which may result in over-aerating the relatively small volume of liquid. As such, it will be appreciated that a preconfigured steaming and aeration protocol may not be equally effective across a range of beverage volumes. While it may be possible to customize the protocol prior to each steaming and/or aeration operation, such methods are cumbersome and introduce unnecessary complexity.

Advantageously, control system 150 may be configured to actively monitor the heating and aeration process, and to automatically adjust the parameters of the process to account for variations between subsequent preparations, such as different finished beverage volumes, and different desired temperatures or foam consistencies. For instance, in some embodiments, control system 150 can be communicably coupled to one or more sensors disposed in the interior of container assembly 12. In this manner, control system 150 can be configured to automatically adjust the parameters of the process based on detected characteristics of the liquid residing within container assembly 12 during the heating and aeration process.

For instance, in one configuration, the control system 150 may be communicably coupled with user interface 40, and temperature sensor 50. A user may select a temperature and aeration profile through user interface 40. User interface 40 may then transmit the user's selection to control system 150. Control system 150 may be configured to implement a routine configured to achieve the desired temperature and aeration profile. Control system 150 may determine the initial temperature of the fluid residing within the interior of container assembly 12, as reported by temperature sensor 50. Control system 150 may then manipulate steam source 14, and the corresponding check valves and passageways to deliver a flow of steam through steam and air conduit 15, through nozzle 22, and into the interior of container assembly 12. Control system 150 may be configured to initiate the flow of steam at a known inlet pressure, known flow rate, and known temperature. Control system 150 may then monitor the rate at which the temperature of the liquid residing within the interior of container assembly 12 increases. Based on the rate at which the temperature of the liquid continually increases, or the time taken to achieve a second elevated temperature, control system 150 may be configured to determine the volume of liquid residing within the interior of container assembly 12. For instance, based on the known rate of flow from steam source 14, the rate at which the temperature of the fluid increased, and the specific heat capacity of the fluid, control system 150 is able to calculate the approximate volume of fluid residing within container assembly 12 since the rate at which the temperature of the liquid increases is proportional to the volume of the liquid. However, it will be appreciated that a wide variety of techniques exist for estimating the volume of the liquid based on the rate of heating. For instance, in certain configurations, power curves or linear fits may be employed to model the rate of temperature increase. In certain embodiments, look up tables can be used.

Having estimated the volume of liquid residing within the interior of container assembly 12, control system 150 may adjust the parameters of the heating and aeration routine to account for the calculated volume of fluid. For instance, control system 150 may increase the rate of steam flow to account for larger volumes of fluid, or decrease the rate of steam flow to account for smaller volumes of fluid. In a similar manner, control system 150 may increase the rate at which air is delivered into the interior of container assembly 12 to account for a larger volume of fluid to be aerated. Likewise, the control system 150 may decrease the rate of air flow to account for a smaller volume of fluid to be aerated. Advantageously, in some configurations, control system 150 is configured to continuously monitor the steaming and aeration operation, and continuously optimizes the parameters of the routine to achieve the desired characteristics in the finished beverage. It has been found that determining the volume of liquid residing within the interior of container assembly 12 in this manner simplifies the overall production process. For instance, since the system is configured to automatically determine the volume of liquid residing within the interior of the container assembly 12, there is no need for the user to manually identify a preferred fill level and to deliver an appropriate volume of liquid, to weigh the liquid to determine an appropriate amount, or to manipulate a preconfigured steaming and/or aeration profile to account for a specific volume of beverage.

In some embodiments, control system 150 may be communicably coupled with one or more sensors configured to detect quantifiable characteristics of the liquid residing within the interior of container assembly 12. For instance, in various configurations, control system 150 may be communicably coupled with a temperature sensor 50. Advantageously, such a configuration allows the control system 150 to monitor the steaming and aeration process, and to automatically perform a predefined routine to achieve a desired temperature or foam consistency. However, it will be appreciated that additional characteristics of the liquid residing within the interior of container assembly 12 may be monitored through additional or alternate sensors. For instance, in various configurations, additional sensors may be employed to observe or detect one or more of: the mass of the liquid, pH of the liquid, the pressure of the liquid, the turbidity of the liquid, the current within the liquid, among other characteristics.

After a user selects an option, the control system 150 can also be configured to monitor the change in temperature over time, and adjust steam flow characteristics accordingly. For instance, in some configurations, the system 10 can detect that the temperature of the liquid residing in the pitcher 12 is increasing rapidly. From the rapid temperature increase, the system 10 can infer that a small volume of liquid has been introduced into the pitcher 12 for heating, and reduce the flow of steam accordingly. Moreover, the system 10 can be configured to detect the size or type of pitcher 12 currently in use, and to adjust the initial air and/or steam flow values to be used in a particular heating or aeration operation. For instance, the system 10 can be configured to detect that a small volume pitcher 12 is in use and reduce the initial flow rate of steam and/or air accordingly. Likewise, in certain configurations, the system can detect that a large volume pitcher 12 has been placed upon the base assembly 24 and automatically increase the flow rate of steam and/or air to accommodate the anticipate larger volume of liquid. In addition, as noted above, in some embodiments, the system 10 can be configured to stop and/or prevent the initiation of an aeration and/or heating operation if communication with the temperature sensor is interrupted.

In a similar manner, the system can be configured to perform a wide variety of functions automatically. For instance, in some embodiments, the system can be configured to detect the size of the container assembly 12 and choose an appropriate steaming and/or aeration sequence. Similarly, the system can be configured to automatically halt the steaming and/or aeration procedures when a predefined stop-point has been reached. A user may set a predefined temperature, for instance, by rotating a radially mounted dial disposed on the outside perimeter of control apparatus 40. By rotating the radially mounted dial, a user of the system 10 may select a preferred shut-off temperature for a particular aeration and heating operation. Likewise, the system can be configured to automatically stop the heating operation once a predefined period of time has been allowed to elapse, or to automatically halt the aeration procedure once a predefined foam characteristic has been achieved. Moreover, the control system 150 can be configured to return the aforementioned valves to a default position after the aeration or heating operation has concluded, or after the container assembly 12 has been removed from the system 10 for a period of time. Likewise, the control system 150 can be configured to halt the aeration or heating operation if the control system's communication with the aforementioned valves is interrupted or compromised, or if the user of the system 10 attempts to perform a function outside of standard operational parameters, such as removal of pitcher 9 during a steaming operation, or a user attempting to exceed predefined temperature or time limits, among other possibilities. In certain embodiments, the control system 150 may be programmed with various steaming and/or aeration profiles to facilitate the production of certain beverages.

Although various implementations discussed above allow steam and/or air to be introduced into the interior of container assembly 12 through the bottom of the container assembly 12, it will be appreciated by the skilled artisan that the disclosed system 10 is not so limited. As depicted in FIG. 11, the system can be configured to receive a flow of steam and/or air through the generally open upper end 18 of container assembly 12. For instance, as depicted in FIG. 11, a steam and/or air wand 140 may be inserted into the interior of container assembly 12 through the generally open upper end 18. In this manner, the container assembly 12 can be used to perform a steaming and/or aeration operation without the use of a base or base assembly configured to provide a flow of steam and/or air through the bottom end of the container assembly 12. Rather, a flow of steam and/or air may be initiated through the steam and/or air wand 140, which may be transported to the location of the container assembly 12 where steaming and/or aeration may take place.

Methods

Figure 8:
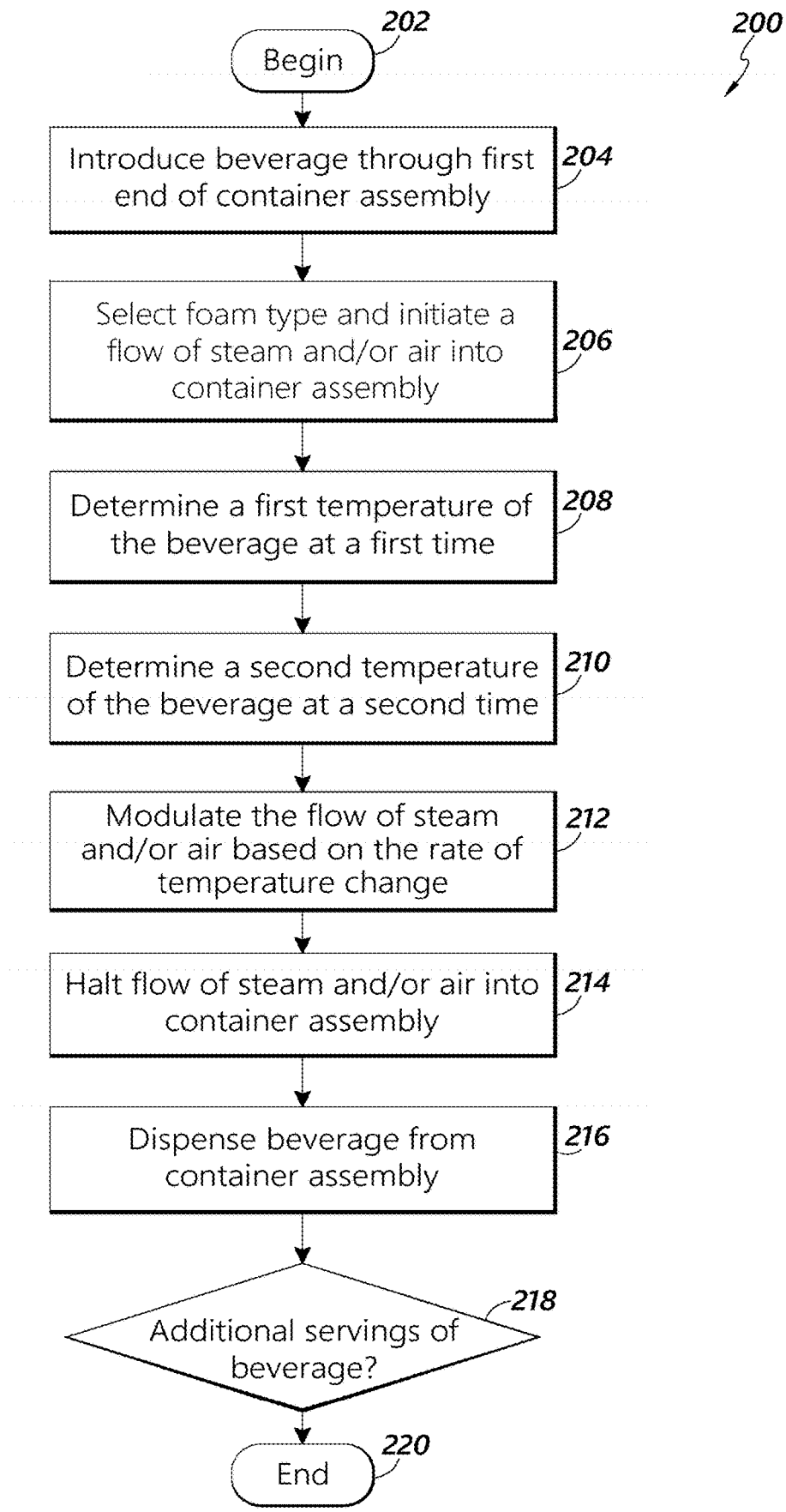
FIG. 8 depicts an example flow chart embodying methods for use with a beverage preparation system.

FIG. 8 illustrates an example method 200 related to various beverage preparation systems. The method begins at block 202. In various configurations, the method may begin by obtaining, preparing, or otherwise providing a serving of a beverage to be heated and/or aerated. In the same or different embodiment, the method may begin by providing a clean, empty container assembly 12 to interface with base assembly 24 so that the heating and/or aeration operation may proceed.

At block 204, a serving of the beverage may be introduced into the container assembly 12. This can be performed when the container assembly 12 is removably coupled with the base 24. Some embodiments include receiving, in the container assembly 12, at least about 1 serving of beverage. Some embodiments include receiving, in the container assembly 12, at least about 500 mL of beverage, though the precise amounts may be varied widely within the scope of this disclosure. For instance, certain variants include filling a substantial volume of the container assembly 12 with the beverage, such as at least about: 75%, 80%, 85%, 90%, 95%, percentages between the aforementioned percentages, or other percentages. In various configurations, the beverage may be introduced into the interior of the container assembly 12 through the generally open first or upper end 18. Once the serving of beverage has been introduced into the interior of container assembly 12, the serving of beverage is retained by the generally closed lower end 20 of the container assembly 12.

Once the beverage has been introduced into the interior of container assembly 12, the method 200 can include selecting certain finished beverage characteristics. For instance, in the method depicted in FIG. 8, the method may comprise selecting a finished foam type, as depicted at block 206. However, it will be appreciated that a wide array of finished beverage characteristics may be selected. For instance, in various configurations, a user may select a preferred finished beverage temperature. Once the finished beverage characteristics have been selected, control system 150 can be configured to initiate a flow of air, steam, or a combination thereof, into the container assembly 12 to heat and/or aerate a beverage residing inside, as further shown at block 206. For example, a user may manipulate user interface 40 to a position 42, 43, or 44. Based on the user's selection, the system can be configured to deliver an appropriate flow of steam and/or air. In some embodiments, the container assembly 12 can receive a flow of steam from a steam source 14, such as through the operation of one or more check valves as described above, allowing the steam to flow through at least some, or substantially all, of the depth of the liquid residing in the container assembly 12. Accordingly, heat may be transferred from the steam into the beverage residing within the container assembly 12. Likewise, a flow of air may be permitted to enter the interior of container assembly 12 to aerate the beverage residing therein.

Advantageously, the system can be configured to monitor the steaming and/or aeration process, and automatically adjust or otherwise optimize the various parameters of the steaming and/or heating operation to ensure the desired finished beverage characteristics are obtained. For instance, as indicated at block 208, the system can be configured to determine a first temperature of the beverage at a first time, such as immediately prior to initializing the heating and/or aeration operation, immediately after initializing the heating and/or aeration operation, or after the heating and/or aeration operation has been allowed to persist for a period of time such as about 1 second, about 2 seconds, about 4 seconds, about 5 seconds, about 10 seconds, about 15 seconds, about 30 seconds, about 45 seconds, or about 1 minute. The system can be configured to determine an initial temperature of the beverage with reference to, for instance, a temperature sensor 50 disposed within the interior of the container assembly 12. It will be appreciated that additional characteristics in addition to temperature may be monitored as well.

After an initial temperature has been determined, the system can be configured to determine a second temperature at a second time, as depicted at block 210. For instance, in various configurations, the system can be configured to determine a second temperature after a predefined period of time has elapsed since the first temperature was determined. By way of example, the system can be configured to determine a second temperature about 1 second after the first temperature was determined. In various additional configurations, the second temperature may be determined about 2 seconds, about 4 seconds, about 5 seconds, about 10 seconds, about 15 seconds, about 30 seconds, about 45 seconds, or about 1 minute after the first temperature was determined. In this manner, a rate of heating can be determined by control system 150.

Based on the rate of heating determined by control system 150, the system 10 can be configured to modulate the flow of steam and/or air based on the rate of heating, as shown at block 212. For instance, where the temperature of the beverage is raising quickly, it can be determined that a small volume of beverage has been introduced, and the control system 150 can automatically adjust steam supply system 102 to reduce the flow of air and/or steam flowing into the interior of container assembly 12 to account for the small volume of beverage. Conversely, where the temperature is not increasing as quickly as anticipated, control system 150 may determine that a large volume of beverage has been introduced, and accordingly increase the rate at which steam and/or air are delivered into the interior of container assembly 12 to account for the large volume of beverage.

Once the desired temperature or form characteristics are achieved, the flow of steam and/or air into the container assembly 12 may be terminated, as shown at block 214. In some embodiments, the system 10 can be configured to automatically halt the flow of steam once a predefined temperature has been reached, or has been allowed to persist for a predefined period of time. For instance, in some embodiments the flow of steam may be allowed to persist for a period of about 25 seconds, 26 seconds, 27 seconds, 28 seconds, 29 seconds, 30 seconds, or any value therein. Alternatively, in certain configurations, the system can be configured to automatically halt the flow of steam once a predefined temperature has been reached, such as about 120° F., 125° F., 130° F., 140° F., 145° F., 150° F., 155° F., 160° F., 165° F., 170° F., 175° F., 180° F., or any value therein. In additional variants, the system 10 can be configured to automatically halt the flow of air once a desired consistency has been achieved.

In some embodiments, the method 200 includes dispensing the beverage from the container assembly into a suitable receptacle, as depicted at block 216. To facilitate dispensing the beverage, container assembly 12 may be removed from base assembly 24 and transported to any suitable location. For instance, a barista may transport the container assembly to a customer to deliver a serving of a beverage.

As illustrated, the method 200 can include a decision block 218, which can ask whether there are additional beverage servings to be prepared and/or dispensed. If the answer is yes, then the method 200 can return to block 204 to introduce additional beverage into the container assembly and the method 200 can continue. In some embodiments, if the answer to the decision block 214 is no, then the method 200 ends at block 220.

As described above, beverage preparation system 10 may be used to prepare a wide assortment of café style beverages. For instance, in some embodiments, a user may introduce a portion of milk through the first end 18 of pitcher 9, disposed atop base assembly 24. In this manner, the liquid may be stored within container assembly 12. In some embodiments, additional modifications may be made to the liquid while it is resident within pitcher 9. For instance, in certain configurations it may be desirable to incorporate one or more shots of espresso into the beverage residing therein.

Once a desired amount of liquid has been introduced into container assembly 12, a user of the system 10 may manipulate the user interface 40 to select preferred heating and aeration characteristics, and the system 10 may be configured to automatically initiate an appropriate flow of air and/or steam into the interior of the container assembly 12.

Once a flow of steam and/or air has been initiated into the container assembly 12, the control system 150 can be configured to monitor the progress of the heating and/or aeration protocol, and automatically adjust the parameters to optimize the operation. For instance, the system can be configured to intermittently or continuously monitor the temperature of the beverage to determine a rate at which the temperature of the beverage is increasing. Based on the rate at which steam and air are introduced into the interior of the container assembly 12, and further based on the rate at which the temperature of the beverage is increasing, the control system 150 can be configured to estimate the volume of beverage residing within the interior of container assembly 12 and manipulate the flow of air and/or steam to ensure that the desired finished beverage characteristics are achieved.

As shown in FIGS. 10A and 10B, in some configurations, at least one of the base 24 or seat 101 may be equipped with one or more magnets 171 to facilitate placement of the base 24 on the seat 101. For instance, in certain configurations, a first magnet 171a may be incorporated in the base 24. Likewise, a second magnet 171b may be incorporated in the seat 101. In certain configurations, the polarity of the magnet 171a disposed in the base may be opposite the polarity of the magnet 171b disposed in the seat 101, as depicted in FIG. 10A. In this manner, incorrect orientation of the base 24 when placed on seat 101 can be prevented. In certain configurations, a plurality of magnets 171 may be disposed within base 24 and/or seat 101. For instance, in some configurations, at least two magnets 171a are incorporated in the base 24, and at least two magnets 171b are incorporated in seat 101, as depicted in FIG. 10B. In some embodiments, magnets can also be used to detect the presence of the pitcher 12 on the base 24. For instance, in certain configurations, a third magnet 181 may be disposed within the pitcher 12. A corresponding magnetic proximity sensor 182 may be disposed within seat 101. In this manner, the presence or absence of the pitcher 12 can be detected by the system 10. Advantageously, this allows the system 10 to detect the absence of pitcher 12, and prevent the flow of air and or steam when the pitcher 12 is not housed on the seat 101. In this manner, it is further possible for the system to automatically halt the heating and/or aeration operation if the pitcher 12 is removed from the seat 101.

Certain Terminology

As used herein, the term "beverage" has its ordinary and customary meaning, and includes, among other things, any edible liquid or substantially liquid substance or product having a flowing quality (e.g., juices, coffee beverages, teas, frozen yogurt, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The claims are not to be limited to the non-exclusive embodiments and examples that are illustrated and described in this disclosure, or that are discussed during the prosecution of the application.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

For purposes of this disclosure, certain aspects, advantages, and features are described herein. Not necessarily all such aspects, advantages, and features may be achieved in accordance with any particular embodiment. For example, some embodiments of any of the various disclosed systems include the container assembly and/or include pluralities of the container assembly; some embodiments do not include the container assembly. Those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale where appropriate, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage preparation systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method of producing a foamed liquid, the method comprising:
   introducing a liquid into the interior of a container assembly;
   selecting at least one finished beverage characteristic;
   initiating a flow of steam into the interior of the container assembly;
   sensing a temperature characteristic of the liquid residing within the interior of the container assembly;
   estimating a volume of liquid residing within the interior of the container assembly based on the sensed temperature characteristic; and
   modulating a flow of steam based on the estimated volume of liquid and the selected finished beverage characteristic.

2. The method of claim 1, wherein the sensed temperature characteristic is a rate of temperature increase.

3. The method of claim 1, wherein the sensed temperature characteristic is a first temperature determined at a first time and a second temperature determined at a second time.

4. The method of claim 1, further comprising initiating a flow of air into the interior of the container assembly and modulating the flow of air based on the estimated volume of liquid and the finished beverage characteristic.

5. The method of claim 1, wherein the at least one finished beverage characteristic includes at least one of: no foam, light foam, medium foam, heavy foam, latte, cappuccino.

6. The method of claim 1, wherein the at least one finished beverage characteristic includes a type of foam.

7. The method of claim 6, further comprising modulating the flow of steam based on the type of foam of the selected finished beverage characteristic.

8. The method of claim 1, further comprising receiving a user selection of a finished beverage type.

9. The method of claim 4, further comprising modulating the flow of air based on a type of foam of the selected finished beverage characteristic.

10. The method of claim 1, wherein the flow of steam is configured to flow through a flow outlet port in a base assembly to provide a pathway for the flow of steam through the base assembly into the interior of the container assembly through a lower end of the container assembly.

11. The method of claim 10, further comprising initiating a flow of air through the pathway of the flow outlet port in the base assembly into the interior of the container assembly through the lower end of the container assembly.

12. The method of claim 10, further comprising forming a seal between the container assembly and the base assembly.

13. The method of claim 1, wherein the at least one finished beverage characteristic includes at least one of a temperature and a degree of aeration.

14. The method of claim 3, wherein a time period between the first time and the second time is predefined.

15. The method of claim 1, wherein the at least one beverage characteristic is selected from a plurality of selection points on a user interface.

* * * * *